United States Patent [19]
Fujisawa et al.

[11] Patent Number: 5,229,898
[45] Date of Patent: Jul. 20, 1993

[54] CASSETTE LOADING AND EJECTION CONTROL SYSTEM FOR MAGNETIC TAPE CASSETTE APPARATUS

[75] Inventors: Shinobu Fujisawa, Akishima; Takao Watanabe, Kamagaya, both of Japan

[73] Assignee: TEAC Corporation, Tokyo, Japan

[21] Appl. No.: 717,342

[22] Filed: Jun. 18, 1991

[30] Foreign Application Priority Data

Jun. 21, 1990 [JP] Japan .................. 2-163731
Jun. 21, 1990 [JP] Japan .................. 2-163732

[51] Int. Cl.$^5$ .................................................. G11B 15/24
[52] U.S. Cl. ............................. 360/96.5; 360/69; 360/71; 360/93
[58] Field of Search ................ 307/69, 88, 90, 93, 307/96.5, 71, 96.1, 96.3

[56] References Cited

U.S. PATENT DOCUMENTS

| 4,219,852 | 8/1980 | Magata et al. | 360/90 |
| 4,611,256 | 9/1986 | Tsujimura | 360/69 |
| 4,701,817 | 10/1987 | Uemura | 360/96.5 |
| 4,748,526 | 5/1988 | Miyao et al. | 360/128 |
| 4,831,660 | 5/1989 | Koga et al. | 360/90 |
| 5,032,940 | 7/1991 | Watanabe et al. | 360/96.5 |

*Primary Examiner*—John Zazworsky
*Attorney, Agent, or Firm*—Woodcock Washburn Kurtz Mackiewicz & Norris

[57] ABSTRACT

A control system for a magnetic tape cassette apparatus of the type requiring no movement of a transducer for the establishment of data transfer contact with the tape cassette. Inserted lengthwise in the apparatus, the tape cassette has its apertured front side oriented toward the fixed transducer. A cassette shift mechanism subsequently moves the tape cassette in its own plane into data transfer contact with the transducer. Then a pair of tape transport spindles are moved into driving engagement with the tape cassette by a tape transport shift mechanism. Both cassette shift mechanism and tape transport shift mechanism are actuated by a motor driven dual control cam under the control of a digital microprocessor controller. The controller has inputs connected to a cam position sensor which detects predetermined angular positions of the dual control cam, a cassette loading sensor which indicates whether the cassette is in the data transfer position, and a tape transport sensor which indicates whether the drive spindles are in or out of driving engagement with the cassette. Relying on digital outputs from these sensors, the controller determines the loading of the cassette in the data transfer position and the ejection of the cassette from the apparatus.

11 Claims, 17 Drawing Sheets

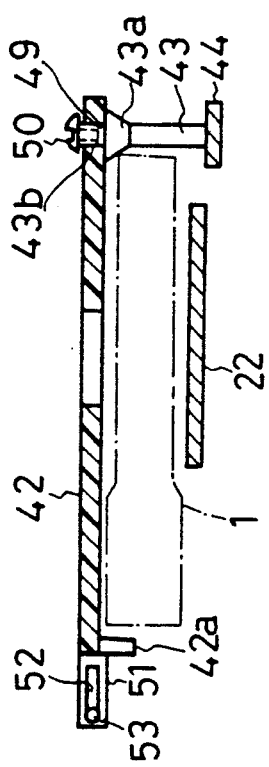
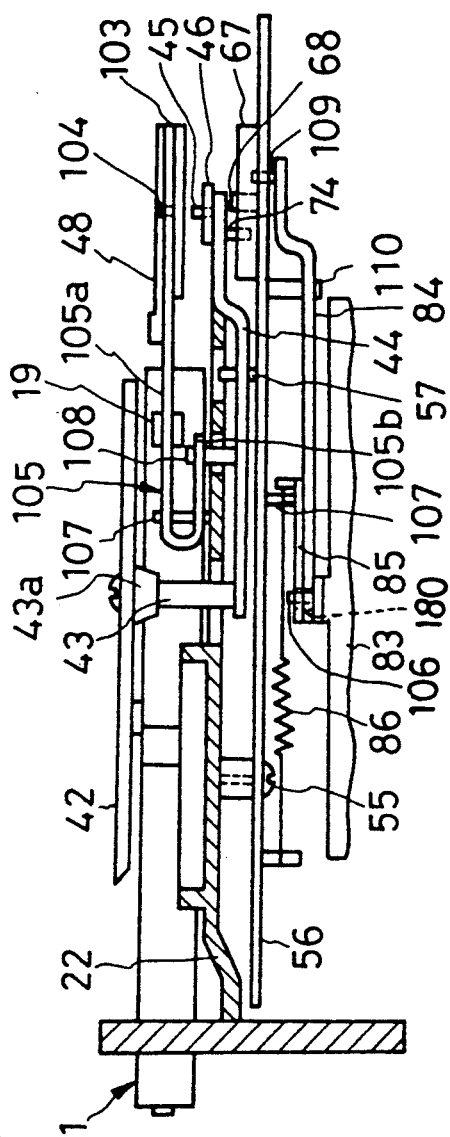
FIG. 8
FIG. 9

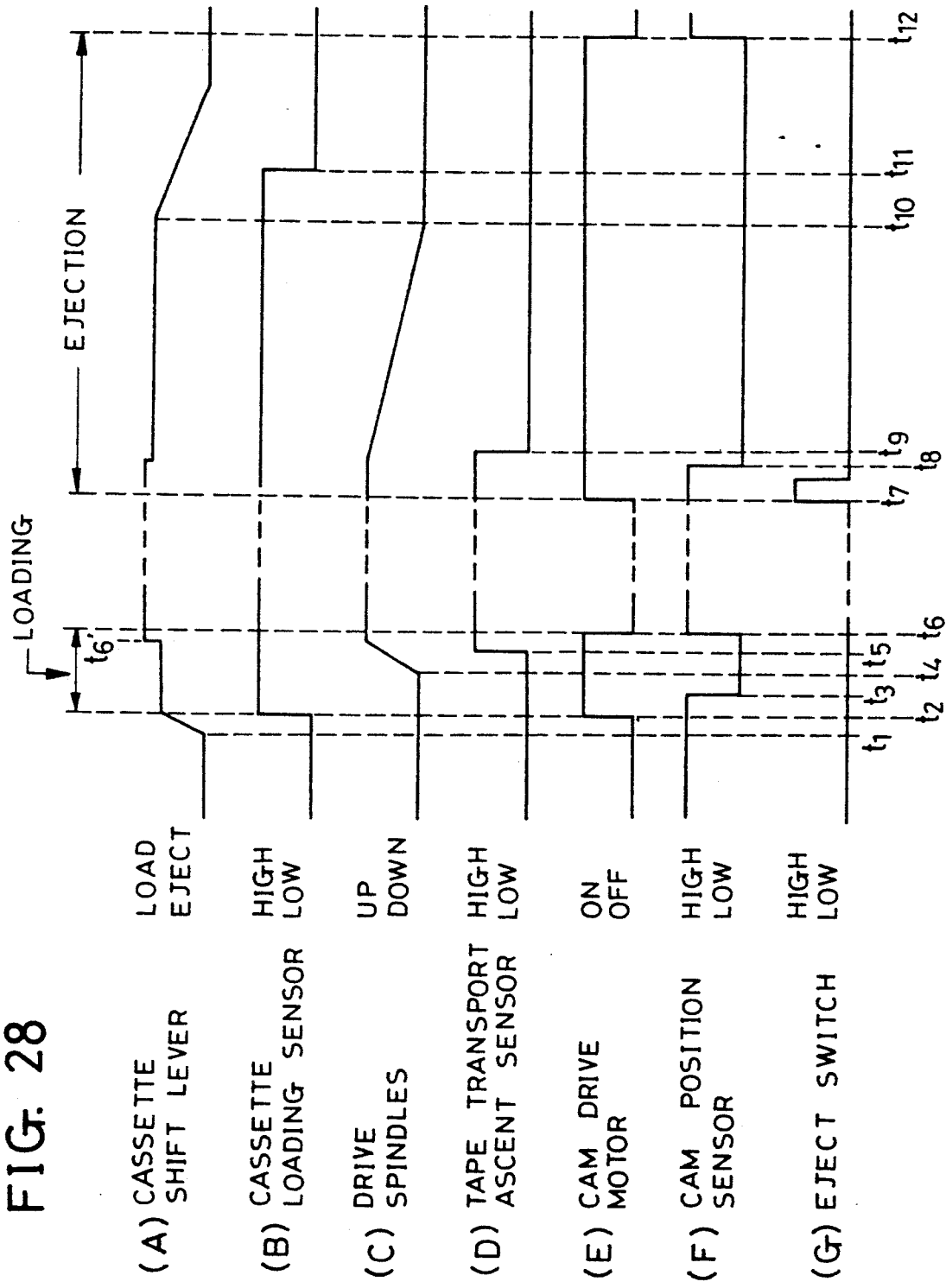

CASSETTE LOADING AND EJECTION CONTROL SYSTEM FOR MAGNETIC TAPE CASSETTE APPARATUS

BACKGROUND OF THE INVENTION

Our invention relates to an apparatus for the recording and/or reproduction of information, particularly digitized information, on magnetic tape packaged in cassette form. More specifically, our invention pertains to a control system in such magnetic tape cassette apparatus for automating its operation associated with the loading and ejection of the tape cassette into and out of the apparatus.

Still more specifically, our invention deals with improvements in or relating to magnetic tape cassette apparatus of the kind described and claimed in U.S. Pat. Appl. Ser. No. 514,515 filed Apr. 25, 1990, now U.S. Pat. No. 5,084,792, by Watanabe and assigned to the assignee of the instant application. The contents of that prior application will be incorporated herein insofar as is necessary for the full understanding of our present invention.

Generally, in digital magnetic tape cassette apparatus, it is essential that the tape cassette on being loaded in the apparatus be precisely positioned with respect to the transducer for proper data transfer therewith. Some prior art devices have had difficulties in meeting this requirement. The difficulties have arisen in such known devices because not only the tape cassette but also the transducer has had to move relative to some stationary part, such as the casing, of the apparatus for the establishment of data transfer contact therebetween. The tape cassette on being inserted in the entrance slot of the apparatus has been first moved to the data transfer position. Then the transducer has been moved into engagement with the tape of the tape cassette.

U.S. Pat. No. 4,701,817 to Uemura, assigned to the assignee of the instant application, represents a conventional approach to the problem discussed above. This patent has made unnecessary the travel of the transducer to and away from the data transfer position; only the tape cassette, on being inserted fully in the entrance slot, travels linearly and in its own plane to the data transfer position opposite the transducer. Then the pair of motor driven spindles, forming parts of a tape transport, are thrust into driving engagement with the hubs of the tape cassette for tape transportation therebetween.

Although this prior art apparatus was well calculated for the establishment of proper positional relationship between transducer and tape cassette, it still had some shortcomings. The tape cassette on full insertion in the entrance slot was sprung into data transfer contact with the transducer. The drive spindles were also sprung into driving engagement with the tape cassette. For ejection, too, purely mechanical means were employed for retracting the drive spindles out of driving engagement with the tape cassette and for subsequently ejecting the tape cassette from the apparatus. The prior art apparatus was therefore very complex in mechanical construction. Also, because of the use of many springs, the operator had to exert a considerable manual force in depressing a push button for the ejection of the tape cassette.

A partial solution to such shortcomings of the Uemura patent is found in the above cross referenced U.S. Pat. Appl. Ser. No. 514,515 filed by Watanabe. The Watanabe application proposed the use of an electric motor in combination with a cam mechanism for moving the drive spindles into and out of driving engagement with the tape cassette. Although the motor driven tape transport shift mechanism according to Watanabe succeeded in drastically reducing the weaknesses of the Uemura patent, it proved to need further refinement for the establishment of true practical utility in the operation of the apparatus of this kind, particularly with regard to the automation of operations associated with the loading and ejection of the tape cassette.

We have found an additional problem left unsolved in the art. That problem arose in use of the head cleaning cassette described and claimed in U.S. Pat. No. 4,748,526 to Miyao et al., also assigned to the assignee of the present application. Shaped and sized like the tape cassette, the cleaning cassette is to be loaded in the apparatus in manually cleaning the head with a cleaning stick. When the cleaning cassette was loaded in the apparatus, the pair of drive spindles were free to rotate in frictional contact with the bottom of the cleaning cassette. Such rotation of the drive spindles is objectionable because of the unavoidable abrasion of the drive spindles as well as of the cleaning cassette.

SUMMARY OF THE INVENTION

We have hereby invented how to make the tape cassette apparatus of the kind defined, still more positive and reliable in automatic operation associated with the loading and ejection of the tape cassette. We have also discovered how to overcome the noted problem heretofore encountered in use of the cleaning cassette with the tape cassette apparatus.

Briefly, our invention may be summarized as an apparatus for data transfer with a tape cassette of the type having a generally flat boxlike housing accommodating a length of tape for transportation between a pair of hubs mounted within the housing for rotation about respective axes disposed in parallel spaced relationship with each other, with the tape exposed through an aperture in a predetermined front side of the housing extending parallel to a notional line right angularly intersecting the axes of rotation of the hubs.

More particularly, the tape cassette apparatus according to our invention comprises a casing having defined therein an entrance opening through which the tape cassette is to be inserted lengthwise, that is, in the direction of the notional line, and with the front side of the cassette housing oriented in a predetermined direction relative to the casing. The tape cassette upon full insertion in the entrance slot comes to a preassigned retracted position opposite a transducer. A cassette shift mechanism is provided for reciprocably moving the tape cassette relative to the casing in the plane of the tape cassette and in a direction normal to the notional line between the retracted position and a preassigned working position. The tape cassette when in the working position has its tape in data transfer contact with the transducer through the apertured front side of the cassette housing.

Also included are a tape transport mechanism having a pair of drive spindles, and a tape transport shift mechanism operatively engaged with the tape transport mechanism. The tape transport shift mechanism causes the drive spindles to move into and out of driving engagement with the hubs of the tape cassette lying in the working position.

Both cassette shift mechanism and tape transport shift mechanism are actuated by a dual control cam means comprising a cassette shift control cam and a tape transport shift control cam which are constrained to joint rotation about a common axis. The cassette shift control cam is engaged with the cassette shift mechanism for causing the tape cassette to travel between the retracted and the working position, whereas the tape transport shift control cam is engaged with the tape transport shift mechanism for causing the linear movement of the drive spindles into and out of driving engagement with the cassette hubs. The dual control cam means is itself driven from cam drive means typically comprising an electric motor. An eject means is provided for ejecting the tape cassette out of the entrance slot in the casing when the tape cassette is moved by the cassette shift mechanism from the working position back to the retracted position.

The tape cassette apparatus further comprises various sensors for automating its operation. Such sensors include, but are nor necessarily limited to, a cam position sensor, a cassette loading sensor and a tape transport sensor. The cam position sensor is for the detection of an eject position of the dual control cam means in which the tape cassette is in the retracted position and in which the drive spindles of the tape transport mechanism are out of driving engagement with the cassette hubs, and a loading position of the dual control cam means in which the tape cassette is in the working position and in which the drive spindles of the tape transport mechanism are in driving engagement with the cassette hubs. The cassette loading sensor senses whether the tape cassette is in the working position. The tape transport sensor senses whether the drive spindles are in or out of engagement with the cassette hubs.

Electrically connected to the outputs of all these sensors is a controller means which has its output connected to the cam drive means for controlling the joint rotation of the cassette shift control cam and the tape transport shift control cam. The controller means determines the loading of the tape cassette in the working position when the tape transport sensor indicates that the drive spindles of the tape transport means are in driving engagement with the cassette hubs and, at the same time, when the cam position sensor indicates that the dual control cam means is in the loading position. Also, the controller means determines the ejection of the tape cassette when the cassette loading sensor indicates the absence of the tape cassette from the working position and, at the same time, when the cam position sensor indicates that the dual control cam means is in the eject position.

Thus the controller means relies not only on the cassette loading sensor but also on the cam position sensor for the accurate determination of the fact that the tape cassette has been loaded in the working position. Since then the drive spindles are already in driving engagement with the tape cassette, the apparatus is ready for the commencement of data transfer between the cassette and the transducer.

Also, the controller means relies not only on the cassette loading sensor but also on the cam position sensor for the accurate determination of the fact that the tape cassette had been ejected. Then the dual control cam means is infallibly in the eject position, which is the initial position of the dual control cam means.

Possibly, the dual control cam means may be somehow angularly displaced while the apparatus is not in use, with the result that the cam position sensor is not opposed to an eject mark when the apparatus is subsequently switched on. In view of this possibility our invention provides for the automatic initialization of the dual control cam means. Toward this end the eject mark and loading mark to be detected by the cam position sensor are disposed in other than diametrically opposed positions on the dual control cam means. As the dual control cam means is set into rotation at constant speed when the apparatus is switched on, the controller means can discriminate between the eject mark and the loading mark from unequal time intervals at which the two marks are detected successively by the cam position sensor.

The tape cassette apparatus according to our invention is intended for use with a cleaning cassette of the prior art construction, supra, which is of substantially the same shape and size as the tape cassette. The controller means can determine that it is the cleaning cassette, rather than the tape cassette, that has been loaded in the working position, when the cassette loading sensor indicates the presence of a cassette in the working position but when the tape transport sensor indicates that the drive spindles will not move into driving engagement with that cassette. Since then the drive spindles are butting endwise against the cleaning cassette, the controller means causes the tape transport means to hold the drive spindles out of rotation.

The above and other features and advantages of our invention and the manner of realizing them will become more apparent, and the invention itself will best be understood, from a study of the following description and appended claims, with reference had to the attached drawings showing a preferred embodiment of our invention.

BRIEF DESCRIPTION OF THE DRAWINGS

FIG. 8 is a vertical section through the tape cassette apparatus, taken along the line VIII—VIII in FIG. 1;

FIG. 9 is another vertical section through the tape cassette apparatus, taken along the line IX—IX in FIG. 1;

FIG. 28 is a timing chart explanatory of the cassette loading and ejecting operation of the tape cassette apparatus;

DESCRIPTION OF THE PREFERRED EMBODIMENT

General

Figure 5:
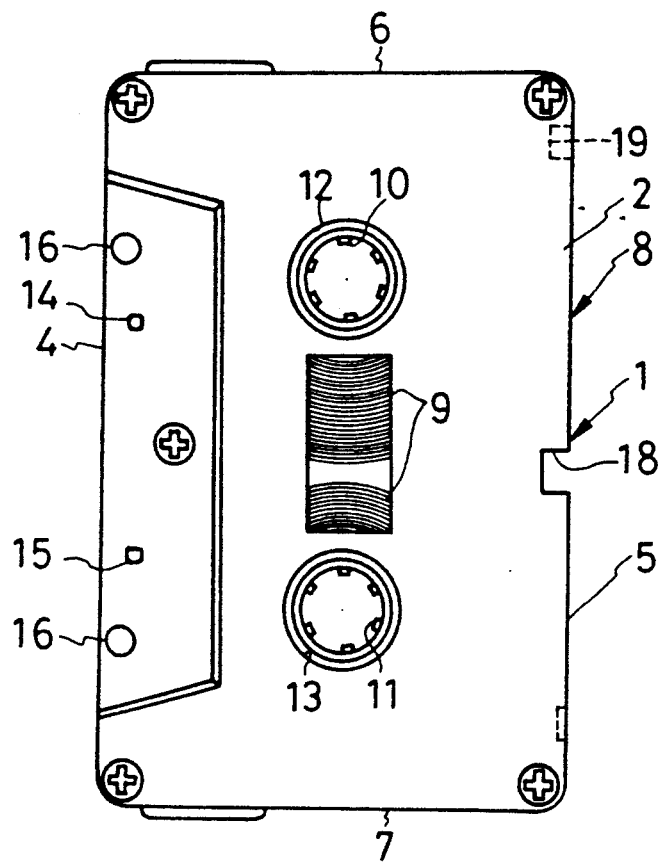
FIG. 5 is a plan view of the tape cassette for use with the apparatus of FIGS. 1-4.
Figure 6:
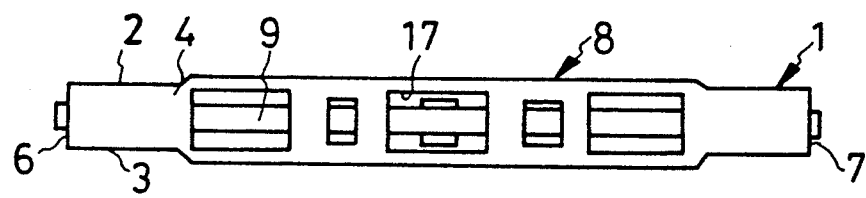
FIG. 6 is a front elevation of the tape cassette.

We will now describe in detail the tape cassette apparatus, generally designated 20 in FIGS. 1-4, of our invention which is intended for use with a multitrack tape cassette shown in FIGS. 5 and 6. As will be seen from FIGS. 1 and 2, the tape cassette apparatus 20 has a generally boxlike casing 21 with a baseplate 22, FIG. 1, immovably mounted therein. An electromagnetic data transducer or head 23 is mounted on the baseplate 22 with its gapped data transfer surface 24 oriented to the right as viewed in FIG. 1. This apparatus 20 requires no movement of the transducer 23 toward or away from the loaded tape cassette, so that the transducer is held fast to the baseplate 22 against movement in a direction normal to a plane tangent to its curved data transfer surface 24. However, in this particular apparatus 20, which is intended for use with multitrack tape cassettes as aforesaid, the transducer 23 is movable in the width direction of the magnetic tape, not shown in FIG. 1, held against its data transfer surface 24.

Figure 2:
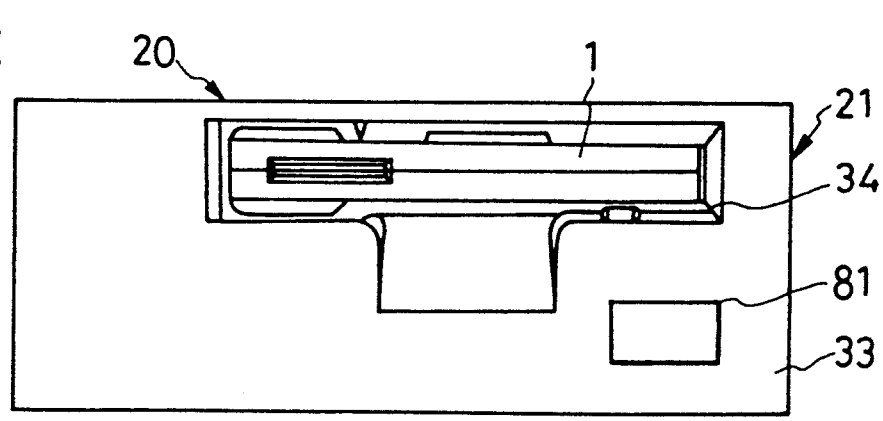
FIG. 2 is a front elevation of the tape cassette apparatus.

At 34 in FIG. 2 is seen an entrance slot or opening 34 formed in the front face 33 of the casing 21. The multitrack tape cassette 1 is to be inserted into, and ejected from, the apparatus 20 through this entrance slot 34.

FIG. 2 depicts the normal attitude in which the tape cassette apparatus 20 is intended for use. The casing 21 is to be placed recumbently, by which we mean the placement such that its front face 33 is vertical, with the entrance slot 34 therein extending horizontally. Therefore, hereinafter in this specification, we will use directional terms such as "upward" and "downward", "horizontal" and "vertical", as well as derivatives thereof, with this recumbent attitude of the casing 21 in mind. Thus, for instance, the transducer 23 is locked against movement in any horizontal direction but is movable vertically, or both upward and downward, relative to the baseplate 22.

Figure 3:
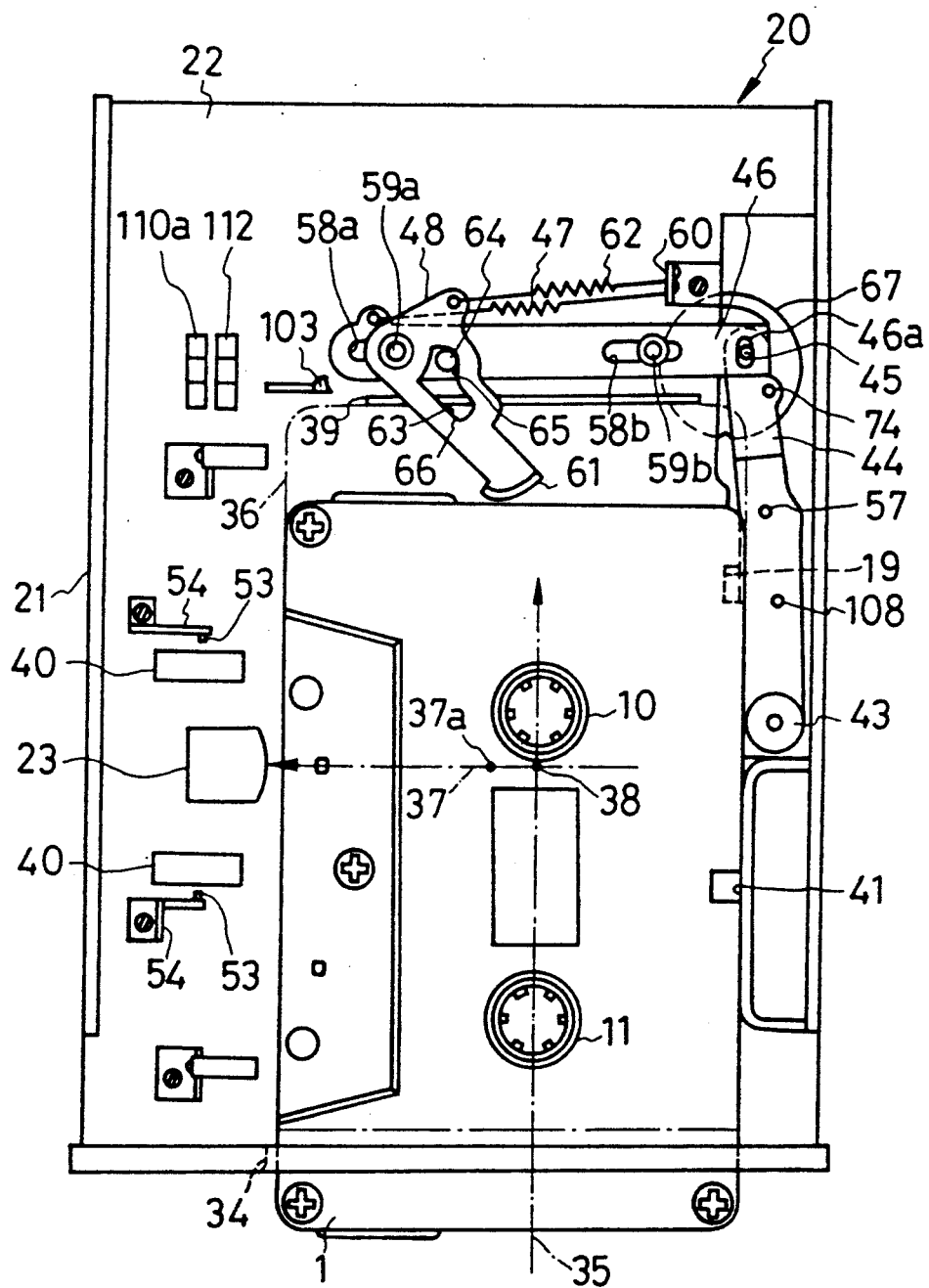
FIG. 3 is a view similar to FIG. 1 except that the tape cassette is shown inserted in the apparatus.

Inserted in the entrance slot 34 along a notional horizontal line 35, FIG. 3, the tape cassette 1 will travel past the solid line intermediate position to the phantom position designated 36 in the same figure. A cassette loading mechanism is provided for transporting the tape cassette 1 from this phantom position to the solid line position of FIG. 4 along a second notional horizontal line 37 at right angles with the first recited notional line 35. The tape cassette 1 is loaded against the transducer 23 in this solid line position of FIG. 4, with its magnetic tape 9 held against the transducer for data transfer.

The noted phantom position of the tape cassette 1 indicated in FIG. 3 is what we call its retracted position, where the cassette is still displaced away from the transducer 23. The solid line position of FIG. 4, then, is the working position where the cassette is in data transfer contact with the transducer 23. A pair of cassette retainer springs 82 on the baseplate 22 resiliently retains the tape cassette 1 in the working position for firmly holding the same in data transfer contact with the transducer 23. It will be appreciated that the tape cassette 1 on being inserted in the entrance slot 34 travels in its own plane into data transfer contact with the transducer 23.

Figure 4:
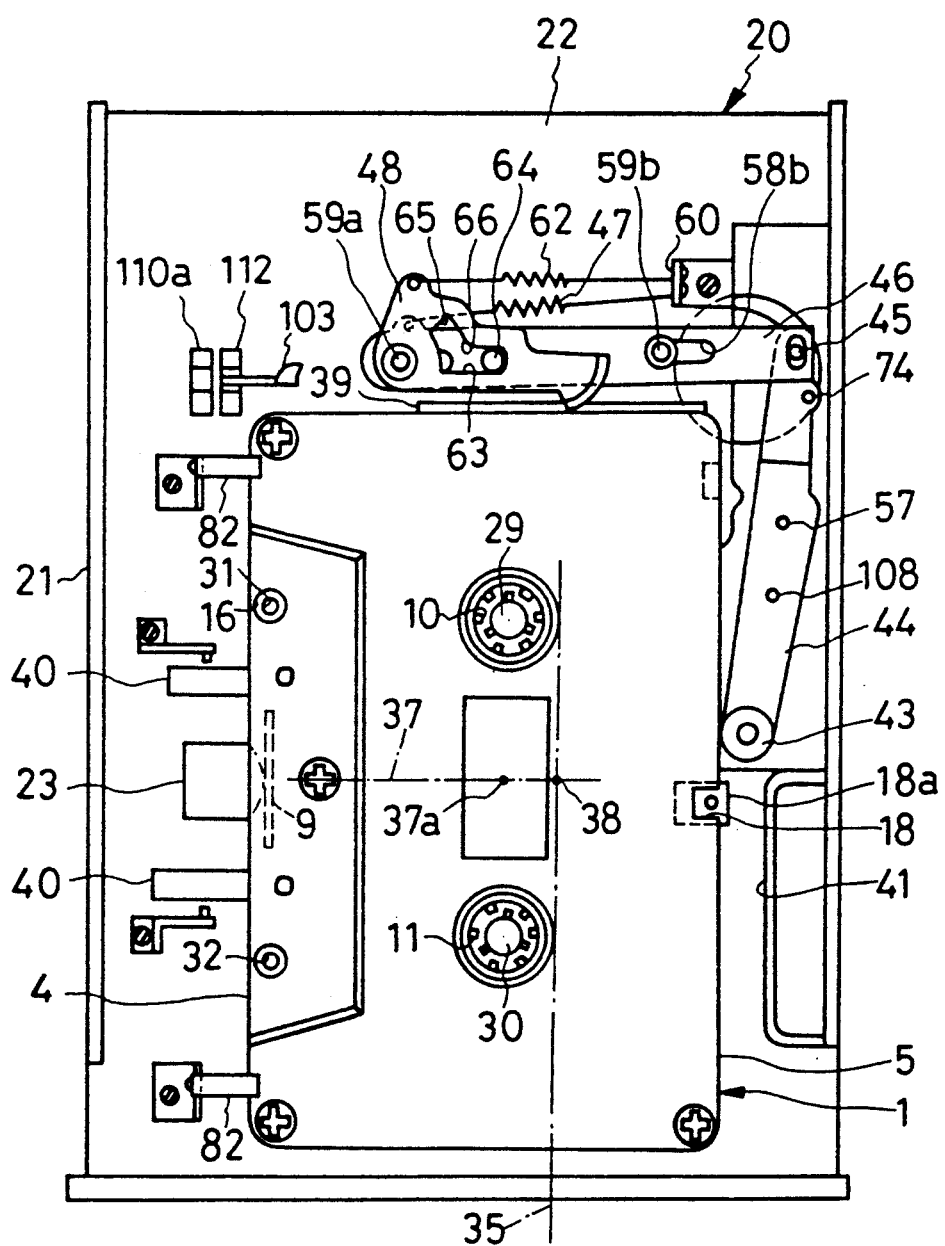
FIG. 4 is also a view similar to FIG. 1 except that the tape cassette is shown shifted to the working position from the retracted position indicated by the broken outline in FIG. 3.

The point 38 of intersection of the two right angular notional lines 35 and 37 in FIGS. 3 and 4 represents the geometrical center (or midpoint between the pair of tape reels or hubs 10 and 11) of the tape cassette 1 when the latter is in the phantom retracted position of FIG. 3. The same geometrical center of the cassette in the solid line working position of FIG. 4 is at a point 37a which is displaced a minimal distance to the left from the point 38 along the line 37. The cassette is required to travel this minimal distance from its retracted to its working position.

Figure 1:
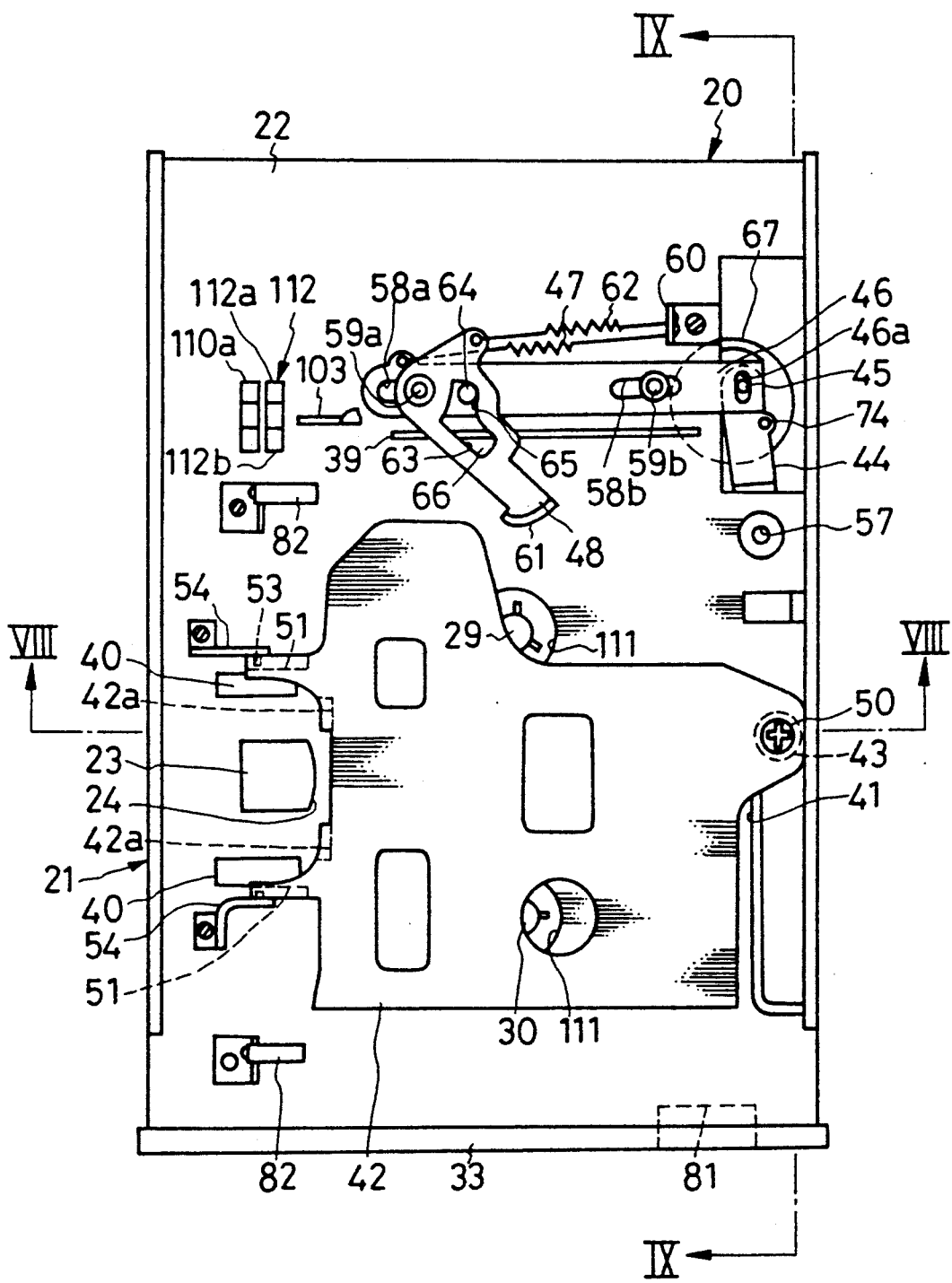
FIG. 1 is a horizontal section through the tape cassette apparatus constructed in accordance with our invention, showing in particular the cassette shift mechanism in a state after the ejection, or for the insertion, of a tape cassette which is not shown here.

FIGS. 1, 3 and 4 show at 39 a combined abutment/guide structure erected on the baseplate 22 for limiting the movement of the tape cassette 1 in the retracted position on being inserted in the entrance slot 34. Then the cassette is to travel along this abutment/guide structure 39 from the retracted to the working position. A pair of limit stops 40 on the baseplate 22 stops the cassette in the working position. As best seen in FIG. 3, a guide 41 on the baseplate 22 guides the travel of the cassette to the retracted position on being inserted in the entrance slot 34.

A tape transport mechanism including a pair of motor driven spindles 29 and 30, FIG. 1, is held retracted under the path of the tape cassette 1 during its travel from the retracted to the working position. When the cassette arrives at the working position, a tape transport shift mechanism operates to raise the tape transport mechanism into driving engagement with the cassette.

The illustrated tape cassette apparatus 20 further comprises a cassette ejector mechanism including an eject pushbutton 81, FIG. 2, for ejecting the tape cassette 1, and a track selector mechanism for permitting the transducer 23 to make selective use of the data tracks of the cassette. The ejector mechanism moves the cassette from the phantom retracted position of FIG. 3 back to the solid line position of the same figure, in which latter position the cassette partly projects out of the entrance slot 34 in the front face of the casing 21. However, no clear distinction can possibly be made between the parts making up the cassette loading mechanism and those constituting the ejector mechanism, so that we will collectively refer to them as the cassette loading and ejecting mechanism. The track selector mechanism can be of the known construction disclosed in the above cross referenced Uemura U.S. Pat. No. 4,701,817.

Additionally, the tape cassette apparatus 20 incorporates various control means for automating its operation according to a control program built into a digital microprocessor controller. Our present invention is directed primarily to this control system.

We will discuss in more detail hereafter the above mentioned tape cassette, tape transport mechanism, cassette loading and ejecting mechanism, tape transport shift mechanism, and control system, in that order. We will divide such discussion under separate headings and, where appropriate, subheadings. The operational description of the complete apparatus 20 will follow the detailed discussion of the listed components. Further, since the operation of the apparatus 20 takes place according to the control program introduced into the controller, we will set forth this control program under a separate heading.

Tape Cassette

With reference to both FIGS. 5 and 6 the tape cassette 1 for use with the apparatus 20 of our invention can be of the standard design having a generally flat, boxlike housing 8. This cassette housing has a pair of opposite main faces 2 and 3, a front side 4, a rear side 5 away from the front side, and a pair of lateral sides 6 and 7. The tape cassette 1 is to be loaded in the apparatus 20 with its main face 2 directed upward. Therefore, this main face 2 is the top face of the cassette, and the other main face 3 its bottom face.

Disposed within the housing 8 are a pair of rotatable hubs or reels 10 and 11 having internal teeth for positive driven engagement with the noted pair of drive spindles 29 and 30, FIG. 1, of the apparatus 20. The internally toothed hubs 10 and 11 are exposed through two aligned pairs of openings 12 and 13 in the main faces 2 and 3 of the cassette housing 8. A length of magnetic tape 9 has its opposite ends anchored to the hubs 10 and 11 for transportation therebetween.

The cassette housing 8 has a series of windows 17 formed in its front side 4. The magnetic tape 9 is exposed through the windows 17 as it extends between the pair of hubs 10 and 11. The central one of the windows 17 is intended for the establishment therethrough of data transfer contact between tape 9 and transducer 23.

Further the cassette housing 8 has formed in its main faces 2 and 3 two pairs of aligned holes 14 and 15 and two other pairs of aligned holes 16. The holes 14 and 15 have been used for insertion of the capstan found in the familiar capstan drive cassette players or decks. However, the illustrated apparatus 20 employs a different principle of tape speed control, so that the holes 14 and 15 are utilized for the insertion of light sources for photoelectrically sensing the beginning and end (BOT and EOT) of the magnetic tape 9. The other pairs of aligned holes 16 are for insertion of tape guide pins seen at 31 and 32 in FIG. 4.

Furthermore, the cassette housing 8 has a recess 18 formed in a preassigned position in its rear side 5. Located off the midpoint of the rear side 5 with respect to its longitudinal direction, the recess 18 is utilized for discriminating whether or not the tape cassette 1 has been properly loaded in the apparatus 20 with its top face 2 directed upward, as will be later explained in more detail in connection with the control system.

At 19 is indicated a file protect tab on the rear side 5 of the cassette housing 8. The file protect tab 19 is to be broken off for protecting the recordings on the magnetic tape 9 against erasure or overwriting.

Tape Transport Mechanism

Figure 7:
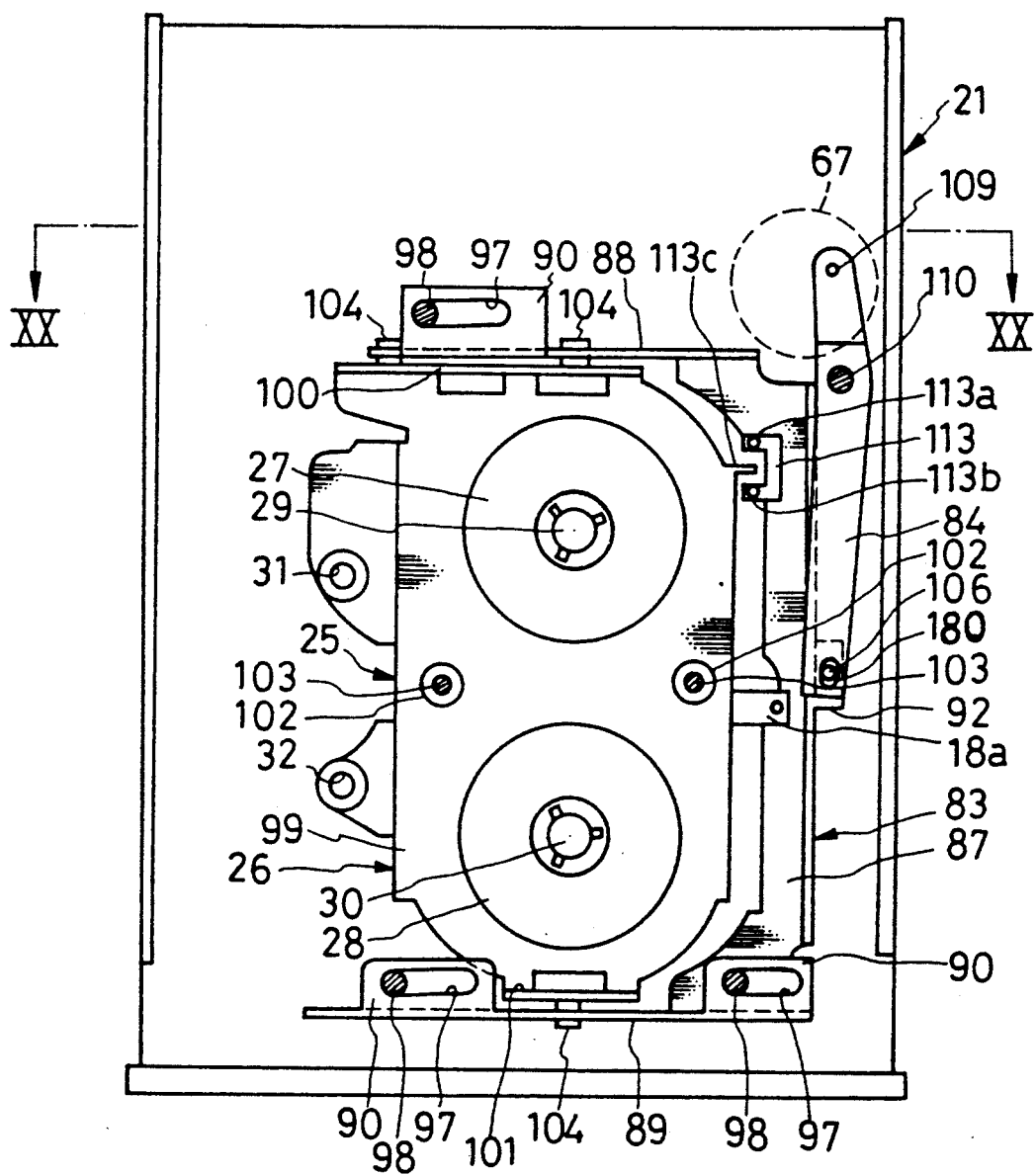
FIG. 7 is another horizontal section through the tape cassette apparatus, showing in particular the tape transport mechanism and the tape transport shift mechanism.

The tape transport mechanism is best illustrated in FIG. 7 which reveals the means under the baseplate 22 by removing the baseplate from the apparatus 20 together with the various means mounted thereon. Generally designated 25, the tape transport mechanism comprises a pair of electric tape transport motors 27 and 28 mounted to a generally flat tape transport carriage 26 laid parallel to the baseplate 22. The tape transport motors 27 and 28 have the noted pair of drive spindles 29 and 30 coupled directly thereto so as to extend upwardly therefrom. The tape transport carriage 26 has also mounted thereon the pair of upstanding guide pins 31 and 32.

The tape transport carriage 26 is to be moved up and down with respect to the fixed baseplate 22 by the tape transport shift mechanism to be detailed subsequently. Such up and down travel of the tape transport carriage 26 results in the movement of the drive spindles 29 and 30 into and out of driving engagement with the hubs 10 and 11, FIG. 5, of the tape cassette 1 being held in the working position of FIG. 4. The baseplate 22 is apertured at 111, FIG. 1, to permit such movement of the drive spindles 29 and 30 into and out of driving engagement with the cassette hubs 10 and 11. Of course, the tape transport mechanism 25 is held retracted when the tape cassette 1 is in other than the data transfer position. The pair of guide pins 31 and 32 also travel into and out of engagement in the holes 16 in the cassette housing 8 with the up and down travel of the tape transport carriage 26.

The tape transport mechanism 25 does not have the conventional capstan and pinch roller for tape speed control. This apparatus employs, instead, a tape speed control mechanism of the type described and claimed in U.S. Pat. No. 4,163,532 to Sakai. However, the fundamental concepts of our invention are applicable to tape cassette apparatus having the conventional tape speed control system.

Cassette Loading and Ejecting Mechanism

The cassette loading and ejecting mechanism includes a generally flat cassette carriage 42 which is shown in top plan in FIG. 1, in vertical section in FIG. 8, and in side elevation in FIG. 9. The cassette carriage 42 is disposed to overlie the tape cassette 1 when the latter is inserted in and through the entrance slot 34 to the phantom retracted position of FIG. 3. Receiving and engaging the inserted cassette, the cassette carriage 42 travels therewith from the retracted position to the solid line working position of FIG. 4 and, after a desired run of data transfer, back to the retracted position for cassette ejection.

For such linear reciprocation between the two required positions, the cassette carriage 42 is formed to include a pair of fingers 51, FIGS. 1 and 8, each with a guide groove 52 formed therein. The guide grooves 52 slidably receive guide pins 53 mounted to the baseplate 22 via supports 54.

As shown also in FIGS. 1 and 8, the cassette carriage 42 has a pair of lugs 42a depending from its left hand edge. These lugs engage the apertured front side 4, FIGS. 5 and 6, of the tape cassette 1 in retracting the cassette from the working to the retracted position with the cassette carriage 42.

For the travel of the tape cassette 1 with the cassette carriage 42 from the retracted to the working position, on the other hand, a push pin 43 is coupled to the right hand edge of the cassette carriage 42, as shown in FIGS. 1, 8 and 9. Erected on one end of a cassette shift lever 44 seen in FIGS. 1, 3, 4, 8, 9 and 13, the push pin 43 functions not only itself to push the cassette from the retracted to the working position but also to transmit motion from the cassette shift lever 44 to the cassette carriage 42 for the required movement of the cassette between the retracted and the working position.

As best illustrated in FIG. 8, the push pin 43 has a head 43a in the shape of an inverted cone positioned just under the cassette carriage 42. The head 43a has a hollow, internally threaded, upward extension 43b rotatably received in a hole 49 in the cassette carriage 42. A screw 50 is engaged in the tapped hole in the push pin extension 43b in order to prevent detachment of the cassette carriage 42 from the push pin 43. The head 43a is to butt on the tape cassette 1 for pushing the same from the retracted to the working position.

Figure 12:
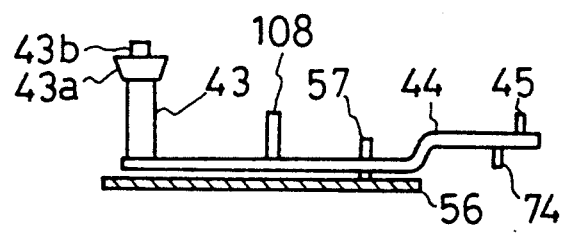
FIG. 12 is a side elevation of the cassette shift lever also forming a part of the cassette loading and ejecting mechanism of the apparatus.
Figure 13:
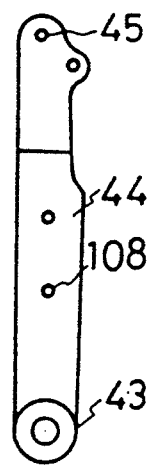
FIG. 13 is a plan view of the cassette shift lever.

Both FIGS. 9 and 12 indicate that the cassette shift lever 44, having the push pin 43 erected on one end thereof, is medially pivoted on an upstanding pin 57. This pivot pin is erected on a subbase plate 56 screwed as at 55 to the underside of the baseplate 22. The cassette shift lever 44 carries a pin 45 on its other end. The pin 45 is slidably engaged in a relatively short slot 46a, FIGS. 1 and 3, formed in one end of an elongate reciprocator 46 extending in the direction of cassette travel between the retracted and the working position.

Figure 11:
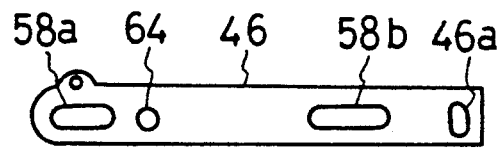
FIG. 11 is a plan view of the reciprocator also forming a part of the cassette loading and ejecting mechanism of the apparatus.

As shown also in FIGS. 11, the reciprocator 46 has two guide slots 58a and 58b extending in its longitudinal direction. The guide slots 58a and 58b slidably receive fixed guide pins 59a and 59b, FIGS. 1 and 3, on the baseplate 22. Thus the pivotal movement of the cassette shift lever 44 about the pivot pin 57 results in the longitudinal movement of the reciprocator 46, and vice versa.

It will also be noted from FIGS. 1 and 3 that a helical tension spring 47 acts between reciprocator 46 and spring retainer 60 on the baseplate 22, biasing the reciprocator to the right as viewed in these figures. As the reciprocator 46 is thus spring to the right, the cassette shift lever 44 is biased to turn in a clockwise direction about the pivot pin 57, that is, in the direction for pushing the tape cassette 1 from the phantom retracted position of FIG. 3 to the solid line working position of FIG. 4.

Figure 10:
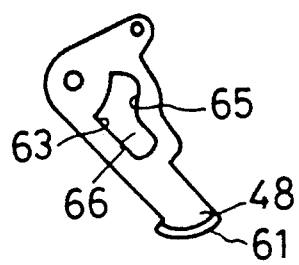
FIG. 10 is a plan view of the eject lever forming a part of the cassette loading and ejecting mechanism of the apparatus.

The noted guide pin 58a for the reciprocator 48 serves also as pivot for an eject lever 48 which appears in FIGS. 1, 3, 4 and 9. As shown also in FIG. 10, the eject lever 48 is a bell crank pivoted at the apex of the angle formed by its two arms. One of the arms of the eject lever 48 terminates in an abutment 61 to be abutted upon by the tape cassette 1 when the latter is being pushed into the entrance slot 34 toward the phantom retracted position of FIG. 3. The other end of the eject lever 48 is engaged with one end of a helical tension spring 82, the other of which spring is hooked to the noted spring retainer 60 on the baseplate 22. Therefore, when the tape cassette 1 is fully pushed in to the retracted position, the eject lever 48 is turned counterclockwise against the force of the tension spring 62 from its FIG. 3 position to that shown in FIG. 4 and remains in this position as long as the cassette stays in either the retracted or the working position.

The eject lever 48 has formed therein an approximately V shaped cam slot 63 slidably receiving a cam follower pin 64 on the reciprocator 46. The cam slot 63 has an arcuate portion 65 and a straight portion 66. Centered about the pivot 59a of the eject lever 48, the arcuate portion 65 receives the cam follower pin 64 when the eject lever 48 is turned clockwise to its FIGS. 1 and 3 position under the bias of the tension spring 62. The reciprocator 46 is then locked in its left hand position. Since then the cassette shift lever 44 is held turned counterclockwise about its medial pivot 57, the cassette carriage 42 stays in the retracted position as in FIG. 1.

Upon full insertion of the tape cassette 1 in the entrance slot 34, the eject lever 48 is thereby pivoted counterclockwise from its FIGS. 1 and 3 position to that of FIG. 4 against the force of the tension spring 62. Then, as the cam follower pin 64 relatively slides into the straight portion 66 of the cam slot 63, the reciprocator 48 becomes free to travel to the right under the force of the tension spring 47. The result is the clockwise turn of the cassette shift lever 44 and, in consequence, the travel of the tape cassette 1 from the retracted to the working position together with the cassette carriage 42.

Figure 14:
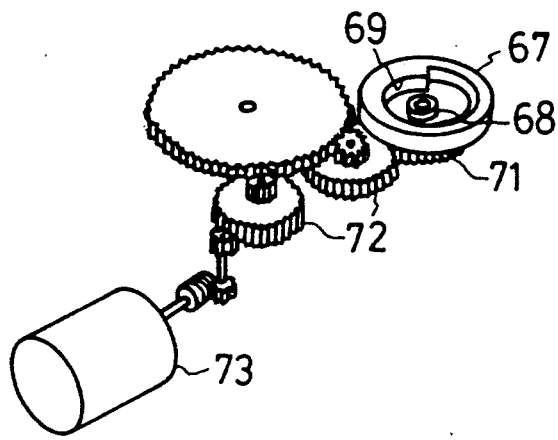
FIG. 14 is a perspective view of the dual control cam, the electric drive motor, and a gear train through which the dual drive cam is driven from the motor.

Employed for the retraction of the tape cassette 1 is a disklike dual control cam 67 disposed adjacent the cassette shift lever 44, as shown in FIGS. 1 and 3, for acting directly thereon. We have named the dual control cam 67 so because it drives not only the cassette shift lever 44 but also the tape transport carriage 26, best seen in FIG. 7, for the movement of the drive spindles 29 and 30 out of driving engagement with the cassette hubs 10 and 11. The dual control cam 67 is rotatably mounted on an upstanding spindle 68, FIG. 9, on the subbase plate 56. It will be further noted from FIG. 14 that the dual control cam 67 is peripherally toothed at 71 and is driven from a cam drive motor 73 via a train of gears 72. Preferably, the cam drive motor 73 is a reversible direct current motor.

Figure 15:
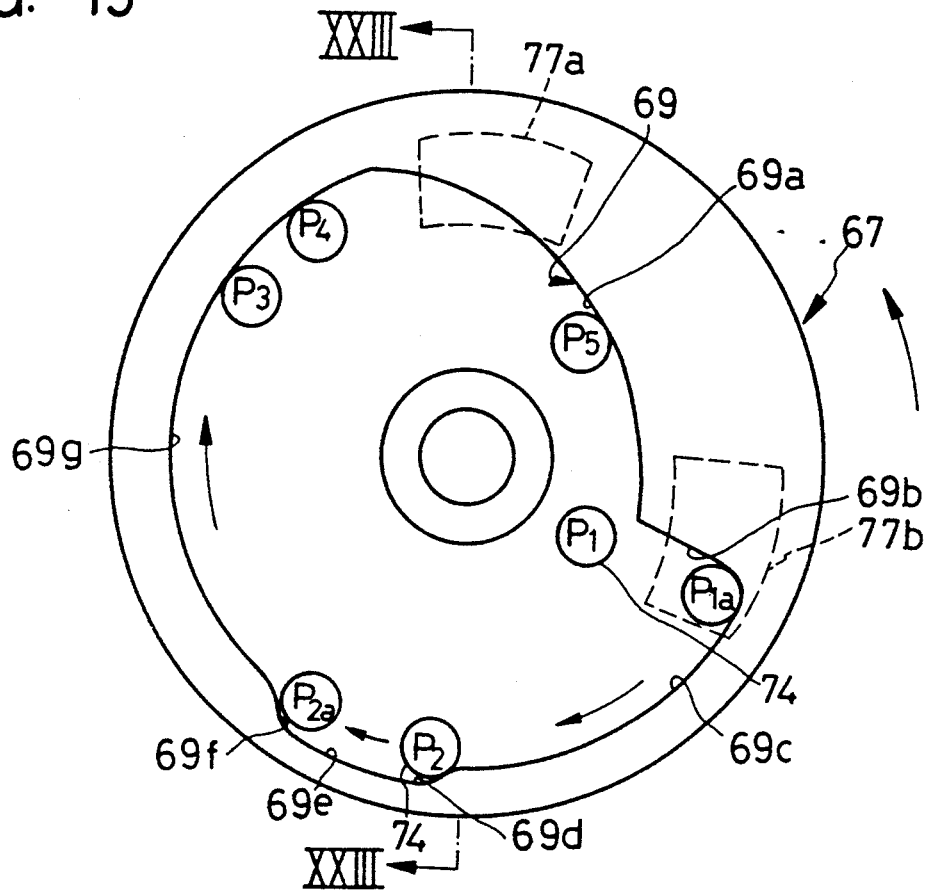
FIG. 15 is an enlarged plan view showing the top face of the dual control cam which has a contoured cam edge for actuating the cassette shift mechanism.
Figure 16:
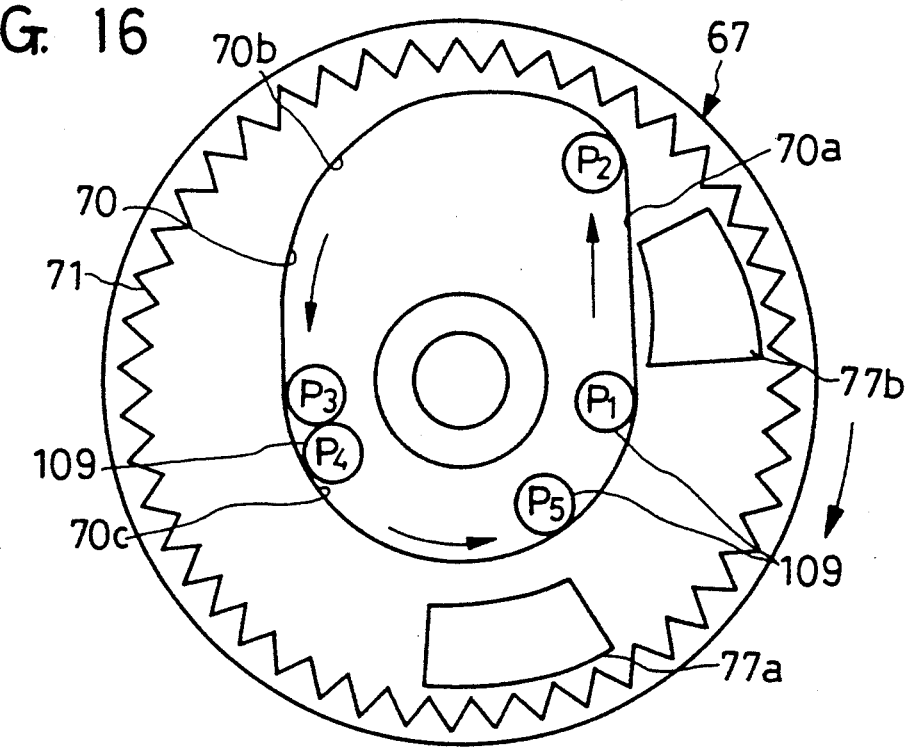
FIG. 16 is an enlarged plan view showing the bottom face of the dual control cam which has another contoured cam edge for actuating the tape transport shift mechanism, the view also showing an eject mark and a loading mark formed in preassigned angular positions on the cam.

FIGS. 15 and 16 are enlarged illustrations of the top and bottom faces, respectively, of the dual control cam 67. With reference to FIG. 15 the top face of the dual control cam 67 has a contoured edge 69 for relative sliding contact with a cam follower pin 74 depending from the cassette shift lever 44, as shown in FIGS. 9 and 12. The bottom face of the dual control cam 67, shown in FIG. 16, is associated with the tape transport shift mechanism, so that we will refer back to FIG. 16 in more detail in the course of the description of the tape transport shift mechanism.

The contoured edge 69 on the top face of the dual control cam 67 represents one of the improvements in accordance with our invention over the prior art. We will therefore discuss the contour of the cam edge 69 in detail hereafter.

Functionally, the contour of the cam edge 69 resolves itself into seven sections designated 69a-69g. The first section 69a, gradually varying in distance from the center of the dual control cam 67, causes the cassette shift lever 44 to turn from its FIG. 4 position to that of FIGS. 1 and 3 as the cam follower pin 74 relatively slides along the first section 69a with the rotation of the dual control cam in the direction of the arrow in FIG. 15. The tape cassette 1 is ejected with such pivotal movement of the cassette shift lever 44.

The second section 69b of the cam edge 69 provides an instantaneous transition from the first section 69a to the third section 69c of greater distance from the cam center. The cassette shift lever 44 is free to pivot clockwise from its FIGS. 1 and 3 position toward that of FIG. 4 as the cam follower pin 74 rides off the first section 69a onto the third section 69c. The tape cassette 1 is pushed from its phantom retracted position of FIG. 3 toward the solid line working position of FIG. 4 with such clockwise turn of the cassette shift lever 44.

The third section 69c of the cam edge 69 delineates an arc of a constant distance from the cam center. The clockwise turn of the cassette shift lever 44 is suspended at a slight distance from its FIG. 4 position as the cam follower pin 74 slides over the third section 69c. Accordingly, the tape cassette 1, which is now spaced a minimal distance to the right from the working position of FIG. 4, has a certain latitude of displacement in its own plane. This latitude of displacement is intended to expedite the ascent of the pair of drive spindles 29 and 30 into driving engagement with the hubs 10 and 11 of the tape cassette 1, as will become apparent from the subsequent description of the tape transport shift mechanism.

The fourth section 69d of the cam edge 69 provides a brief transition from the third section 69c to the fifth section 69e of the greatest distance from the cam center. The cam follower pin 74 rides over this fourth section 69d after the pair of drive spindles 29 and 30 have risen into driving engagement with the cassette hubs 10 and 11, thereby causing the tape cassette 1 to be pushed fully to the FIG. 4 working position by the cassette shift lever 44 under the influence of the tension spring 47.

After the tape cassette 1 has been loaded in the working position as above, the cam follower pin 74 rides off the fourth section 69d but does not come into contact with the fifth section 69e. That is because the clockwise turn of the cassette shift lever 44 is restrained as the push pin 43 thereon butts on the tape cassette 1 being held in the working position. Consequently, when the cam follower pin 74 is opposed to the fifth cam section 69e, the tape cassette 1 is forced to stay in the working position by the tension spring 47 for correct data transfer with the transducer 23.

For ejection, the cam follower pin 74 rides over the sixth cam section 69f of brief duration onto the seventh cam section 69g. This seventh cam section delineates an arc which is centered about the axis of the dual control cam 67 and which is of approximately the same radius as the third cam section 69c. The force of the tension spring 47 no longer acts on the tape cassette 1, so that the cassette has some latitude of displacement in its own plane as when the cam follower pin 74 rides over the third cam section 69c. The pair of drive spindles 29 and 30 are to smoothly descend out of driving engagement with the cassette hubs 10 and 11 by taking advantage of the latitude of cassette displacement when the cam follower pin 74 rides over the seventh cam section 69g.

The circled indicia $P_1$-$P_5$ in FIG. 15 indicate the positions to be successively taken by the cam follower pin 74 on the top face of the dual control cam 67 as the latter rotates in the arrow marked direction. The following discussion of these cam follower positions $P_1$-$P_5$ is tantamount to the discussion of the operation of the cassette loading and ejecting mechanism.

The cam follower pin 74 on the cassette shift lever 44 is in the position $P_1$ on the top face of the dual control cam 67 when the tape cassette 1 is not loaded in the apparatus 20. The cassette shift lever 44 is then in the position of FIGS. 1 and 3, holding the cassette carriage 42 retracted away from the transducer 23.

Upon insertion of the tape cassette 1 in the entrance slot 34, FIG. 2, the eject lever 48 will be thereby turned from its FIG. 3 position to that of FIG. 4 against the bias of the tension spring 62. Then, with the cam follower pin 64 on the reciprocator 46 admitted from the arcuate portion 65 into the straight portion 66 of the cam slot 63, the reciprocator will travel from the FIG. 3 to FIG. 4 position under the influence of the tension spring 47 thereby turning the cassette shift lever 44 clockwise about the pivot 57. Then the push pin 43 on the cassette shift lever 44 will push the tape cassette 1 from the phantom retracted position of FIG. 3 toward the solid line working position of FIG. 4 together with the cassette carriage 42 shown in FIG. 1.

However, at this time, the tape cassette 1 is not yet urged against the pair of limit stops 40 on the baseplate 22 under the force of the tension spring 47. As will be understood by referring to FIG. 15 again, the cam follower pin 74 on the cassette shift lever 44 will travel from position $P_1$ to position $P_{1a}$ on the bottom face of the dual control cam 67 with the clockwise turn of the cassette shift lever described above. The cam follower pin 74 when in the position $P_{1a}$ bears against the section 69c of the cam edge 69 under the force of the tension spring 47. Consequently, when the cam follower pin 74 is riding on the constant radius section 69c of the cam edge 69, the tape cassette 1 is somewhat loosely held in the working position of FIG. 4, being free from the force of the tension spring 47. The pair of drive spindles 29 and 30 of the tape transport mechanism 25 are to be raised into driving engagement with the cassette hubs 10 and 11 by the tape transport shift mechanism, to be detailed subsequently, when the tape cassette 1 is being thus loosely held in the working position.

The cam follower pin 74 will arrive at the position $P_2$ on the cam section 69d upon completion of the driving engagement of the drive spindles 29 and 30 with the cassette hubs 10 and 11. Then the cam follower pin 74 will slide over the cam section 69d toward the greatest radius cam section 69e thereby permitting the cassette shift lever 44 to turn further clockwise under the force of the tension spring 47. The tape cassette 1 will butt against the pair of limit stops 40 shortly before the cam follower pin 74 comes into contact with the greatest radius cam section 69e.

Now the tape cassette 1 is firmly held in the working position under the force of the tension spring 47, as shown in FIG. 4, besides being urged against the baseplate 22 by the pair of cassette retainer springs 82. The transducer 23 is now in data transfer contact with the magnetic tape 9 of the cassette 1.

For ejection, the dual control cam 67 will rotate from position $P_2$ back to position $P_1$ in response to the actuation of the eject pushbutton switch 81. As the cam follower pin 74 rides onto the cam section 69g, the cassette shift lever will be slightly turned counterclockwise from its FIG. 4 position. The tape cassette 1 is no longer acted upon by the tension spring 47, so that the tape transport mechanism will be easily retracted out of driving engagement with the cassette. The radial position of the cam follower pin 74 on the dual control cam 67 will remain substantially unchanged when the cam follower pin is riding on the cam section 69g, so that the tape cassette 1 will remain loose in the working position pending the descent of the drive spindles 29 and 30 out of driving engagement with the cassette hubs 10 and 11.

Then, riding on the cam section 69a, the cam follower pin 74 will travel closer to the center of the dual control cam 67. The cassette shift lever 44 will then turn counterclockwise against the force of the tension spring 47 from its FIG. 4 to FIG. 3 position thereby shifting the tape cassette 1 from its working to retracted position together with the cassette carriage 42 shown in FIG. 1.

The cam follower pin 64 on the reciprocator 46 will enter the arcuate portion 65 of the cam slot 63 in the eject lever 48 upon retraction of the tape cassette 1. Then the eject lever 48 will turn counterclockwise from its FIG. 4 to FIG. 3 position under the bias of the tension spring 62 thereby ejecting the tape cassette 1 as indicated by the solid line in FIG. 3.

Tape Transport Shift Mechanism

The tape transport shift mechanism appears in FIGS. 7, 9 and 17-21. This mechanism functions as aforesaid to raise the tape transport mechanism 25, FIG. 7, into driving engagement with the tape cassette 1 when the latter is moved to the working position of FIG. 4 by the loading and ejecting mechanism of the foregoing construction.

Figure 17:
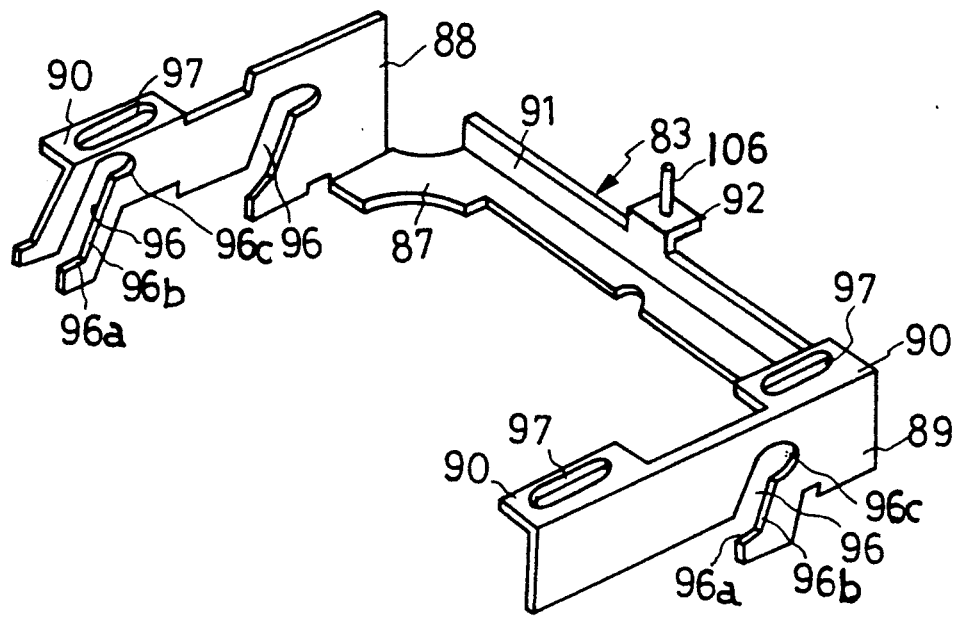
FIG. 17 is a perspective view of the tape transport shift cam forming a part of the tape transport shift mechanism.

The tape transport shift mechanism includes a tape transport shift cam 83, best shown in FIGS. 7 and 17, which is disposed under the subbase plate 56 as seen in FIG. 9. The tape transport shift cam 83 is movable back and forth along the notional line 37 of FIGS. 3 and 4 in order to cause the up and down travel of the tape transport mechanism 25.

As will be noted from FIG. 17 in particular, the tape transport shift cam 83 is a one piece construction of sheet metal. Generally U shaped as seen in a plan view as in FIG. 7, the tape transport shift cam 83 comprises a pair of side portions 88 and 89 extending parallel to the notional line 37, and a connective portion 87 joining the pair of side portions. The side portions 88 and 89 have three flaps 90 bent right angularly from their top edges. The flaps 90 have guide slots 97 formed therein for slidably receiving fixed guide pins 98, FIG. 7, whereby the tape transport shift cam 83 is constrained to linear reciprocation along the notional line 37.

Figure 20:
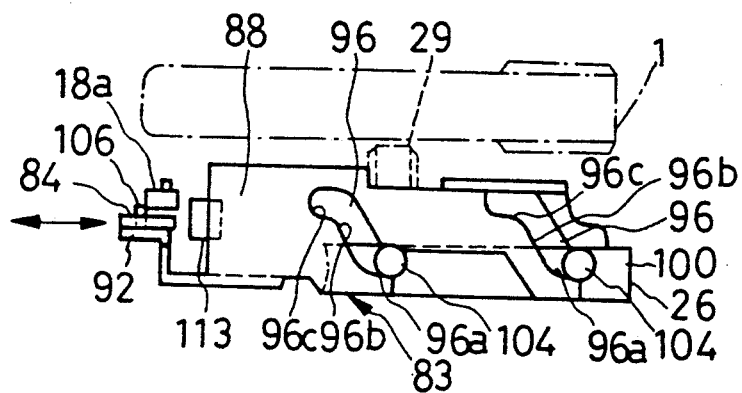
FIG. 20 is a side elevation of the tape transport shift mechanism as seen in the direction of the arrows XX—XX in FIG. 7, the tape transport shift mechanism being shown in a state when the tape transport mechanism is lowered out of driving engagement with the tape cassette indicated by the phantom outline.
Figure 21:
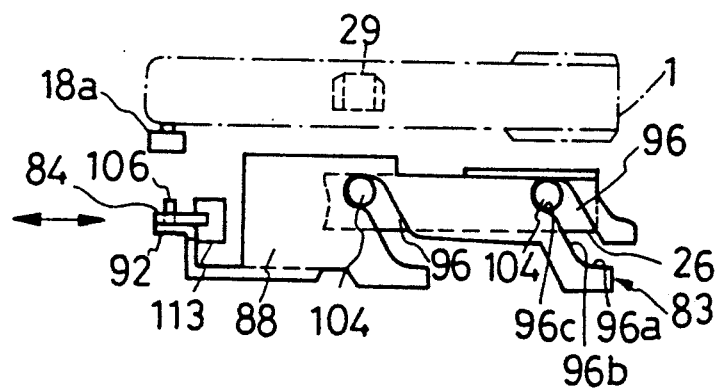
FIG. 21 is a view similar to FIG. 20 except that the tape transport mechanism is raised into driving engagement with the tape cassette indicated by the phantom outline.

It will also be observed from FIG. 17 that the tape transport shift cam 83 has three cam slots 96, two of them in one side portion 88 and the other one in the other side portion 89. FIGS. 20 and 21 indicate that each cam slot 96 comprises a slanting portion 96b and two shorter horizontal portions 96a and 96c joined to the opposite ends of the slanting portion and extending in opposite directions therefrom. The cam slots 96 slidably receive cam follower pins 104.

As will be understood by referring back to FIG. 7, the cam follower pins 104 are formed on a pair of side flanges 10 and 101 at the opposite ends of a web 99 of the tape transport carriage 26. The web 99 of the tape transport carriage 26 has formed therein two guide holes 102 for slidaly receiving upstanding guide pins 103 depending from the baseplate 22.

Thus, with the horizontal reciprocation of the tape transport shift cam 83 along the notional line 37, the cam follower pins 104 relatively slide up and down along the slanting portions 96b of the cam slots 96. The result is the vertical reciprocation of the tape transport mechanism 25 into and out of driving engagement with the tape cassette 1 being held in the working position.

Figure 18:
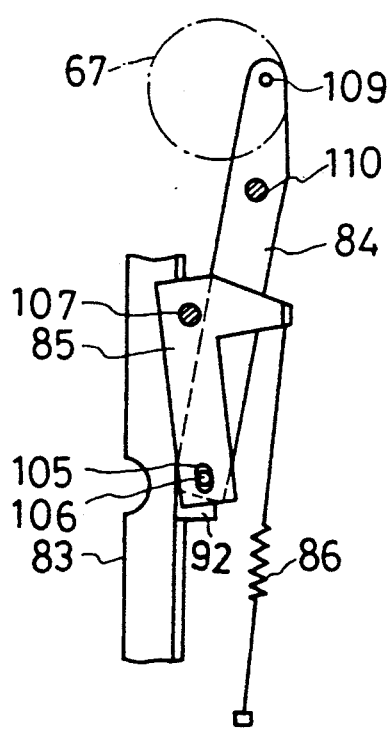
FIG. 18 is a partial top plan of the tape transport shift mechanism shown in a state when the tape transport mechanism is raised into driving engagement with the tape cassette, not shown here, when the cassette is in the working position as shown in FIG. 4.
Figure 19:
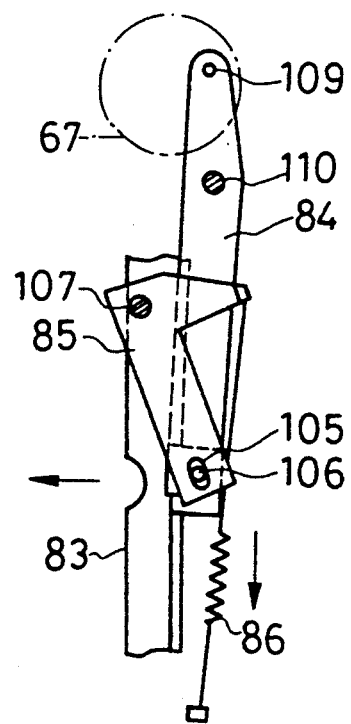
FIG. 19 is a view similar to FIG. 18 except that the tape transport shift mechanism is shown in a state when the tape transport mechanism is lowered out of driving engagement with the tape cassette which is not shown here.

Employed for the horizontal reciprocation of the tape transport shift cam 83 are a tape transport descent lever 84 and a tape transport ascent lever 85, both shown in FIGS. 9, 18 and 19. Both descent lever 84 and ascent lever 85 are disposed under the subbase plate 56.

FIG. 7 shows only the tape transport descent lever 84, it being understood that the tape transport ascent lever 85, not shown here for illustrative convenience, is disposed over the descent lever. The descent lever 84 is medially supported by a pivot pin 110 depending from the subbase plate 56, for pivotal movement in a horizontal plane. One end of the descent lever 84 is slotted at 180 to loosely receive a pin 106 on a lug 92, shown also in FIG. 17, on a flange 91 of the connective portion 87 of the tape transport shift cam 83. The other end of the descent lever 84 has a cam follower pin 109 erected thereon for sliding engagement with the bottom face of the dual control cam 67 shown in FIG. 16, as will be detailed presently. Suffice it to say for the moment that, when turned counterclockwise by the dual control cam 67 from its FIG. 18 position to that shown in FIG. 19, the descent lever 84 causes the tape transport shift cam 83 to travel to the right. The cam follower pins 104 relatively slide down the cam slots 96 with such rightward travel of the tape transport shift cam 83, resulting in the descent of the pair of drive spindles 29 and 30 out of driving engagement with the cassette hubs 10 and 11.

With reference to FIGS. 9, 18 and 19 the tape transport ascent lever 85 is supported at one end on a pin 107 on the subbase plate 56 for pivotal movement in a horizontal plane. The other end of the ascent lever 85 is also slotted at 105 to slidably receive the noted pin 106 on the tape transport shift cam 83. A helical tension spring 86 biases the ascent lever 85 in a clockwise direction, as viewed in FIGS. 18 and 19, and so urges the tape transport shift cam 83 to the left, that is, toward the transducer 23. When the ascent lever 85 is turned clockwise from its FIG. 19 position to that of FIG. 18 under the bias of the tension spring 86, the tape transport shift cam 83 causes the cam follower pins 104 to relatively slide up the cam slots 96, with the consequent ascent of the pair of drive spindles 29 and 30 into driving engagement with the cassette hubs 10 and 11.

Reference is now directed back to FIG. 16 for a more detailed study of the bottom face configuration of the dual control cam 67 which is associated with the tape transport shift mechanism. In this figure, too, as in FIG. 15, the circled indicia $P_1$-$P_5$ represent the various positions of the cam follower pin 109 on the tape transport descent lever 84 with respect to the bottom face of the dual control cam 67. We use the same indicia $P_1$-$P_5$ in both FIGS. 15 and 16 because each of these represents the positions of the cam follower pins 74 and 109 when the dual control cam 67 is in one and the same angular position. For example, when the cam follower pin 74 is on the position $P_1$ on the top face of the dual control cam 67 in FIG. 15, the cam follower pin 109 is in the position $P_1$ on the bottom face of the dual control cam 67 in FIG. 16.

The bottom face of the dual control cam 67 has a contoured edge 70 for relative sliding contact with the cam follower pin 109. The contoured cam edge 70 is broadly comprised of a straight section 70a, a curved section 70b, and another curved section 70c. As the dual control cam 67 rotates in the direction of the arrow in FIG. 16, the straight cam section 70a gradually increases in distance from the center of the dual control cam 67. The curved section 70b gradually decreases in distance from the cam center. The other curved section 70c is at the shortest, constant distance from the cam center.

As has been set forth with reference to FIG. 15 and in connection with the cassette loading and ejecting mechanism, the cam follower pin 74 on the cassette shift lever 44 is in the position $P_1$ on the top face of the dual control cam 67 when the tape cassette 1 is not loaded in the apparatus 20. So, in the tape transport shift mechanism now under consideration, the cam follower pin 109 on the tape transport descent lever 84 is also in the position $P_1$, FIG. 16, on the bottom face of the dual control cam 67 when the tape cassette 1 is not loaded in the apparatus 20. The tape transport descent lever 84 is then fully turned counterclockwise about its pivot 110 to the position of FIGS. 7 and 19, holding the tape transport shift cam 83 moved to the right as seen in these figures. The tape transport carriage 26 is then in the bottom or retracted position of FIG. 20, with the pair of drive spindles 29 and 30 out of engagement with the cassette hubs 10 and 11.

As the dual control cam 67 is set into clockwise rotation as viewed in FIG. 16, the cam follower pin 109 will relatively travel from position $P_1$ to position $P_2$ along the straight section 70a of the cam edge 70, permitting both tape transport descent lever 84 and ascent lever 85 to turn clockwise from their FIG. 19 to FIG. 18 positions under the bias of the tension spring 86. Then the tape transport shift cam 83 will travel linearly from its FIG. 20 to FIG. 21 position. It will be observed from these figures that the cam follower pins 104 on the tape transport carriage 26, which have been initially positioned in the lower horizontal portions 96a of the cam slots 96 in the tape transport shift cam 83, relatively slide up their slanting portions 96b with such horizontal travel of the tape transport shift cam. The tape transport mechanism 25 will be thus raised for the driving engagement of the pair of drive spindles 29 and 30 with the cassette hubs 10 and 11. Further, in the FIG. 21 position of the tape transport shift cam 83, the cam follower pins 104 are caught in the upper horizontal portions 96c of the cam slots 96. The drive spindles 29 and 30 can therefore be positively maintained in driving engagement with the cassette hubs 10 and 11.

As will be understood by referring to FIG. 15, again, the cam follower pin 74 on the cassette shift lever 44 has been sliding along the constant radius section 69c of the cam edge 69 from position $P_{1a}$ to position $P_2$ when the cam follower pin 109 on the tape transport descent lever 84 is traveling as above along the straight section 70a of the cam edge 70 from position $P_1$ to position $P_2$. Accordingly, the tape transport mechanism 25 will be raised for the driving engagement of the drive spindles 29 and 30 with the hubs 10 and 11 of the tape cassette 1 while the latter is being held loosely in the working position of FIG. 4. The pair of guide pins 31 and 32, FIGS. 4 and 7, on the tape transport carriage 26 will also be engaged in the holes 16 in the tape cassette 1. As the tape cassette 1 is subsequently spring retained the working position, the apparatus 20 is ready for the commencement of data transfer therewith.

For the disengagement of the drive spindles 29 and 30 from the cassette hubs 10 and 11, the cam follower pin 109 on the tape transport descent lever 84 is to slide along the curved section 70b, FIG. 16, of the contoured edge 70 on the bottom face of the dual control cam 67 from position $P_2$ to position $P_3$. The tape transport descent lever 84 will then turn counterclockwise from its FIG. 18 to FIG. 19 position thereby causing the tape transport ascent lever 85 also to turn counterclockwise against the force of the tension spring 86. Thus, as the tape transport shift cam 83 travels from its FIG. 21 to FIG. 20 position, the tape transport mechanism 25 will descend with the consequent withdrawal of the drive spindles 29 and 30 out of driving engagement with the cassette hubs 10 and 11.

FIG. 15 indicates that the cam follower pin 74 on the cassette shift lever 44 has been sliding along the constant radius section 69g of the cam groove 69 during the descent of the tape transport mechanism 25. Consequently, the pair of drive spindles 29 and 30 can be smoothly withdrawn from the hubs 10 and 11 of the tape cassette 1 being held loosely in the working position.

Control System

Figure 22:
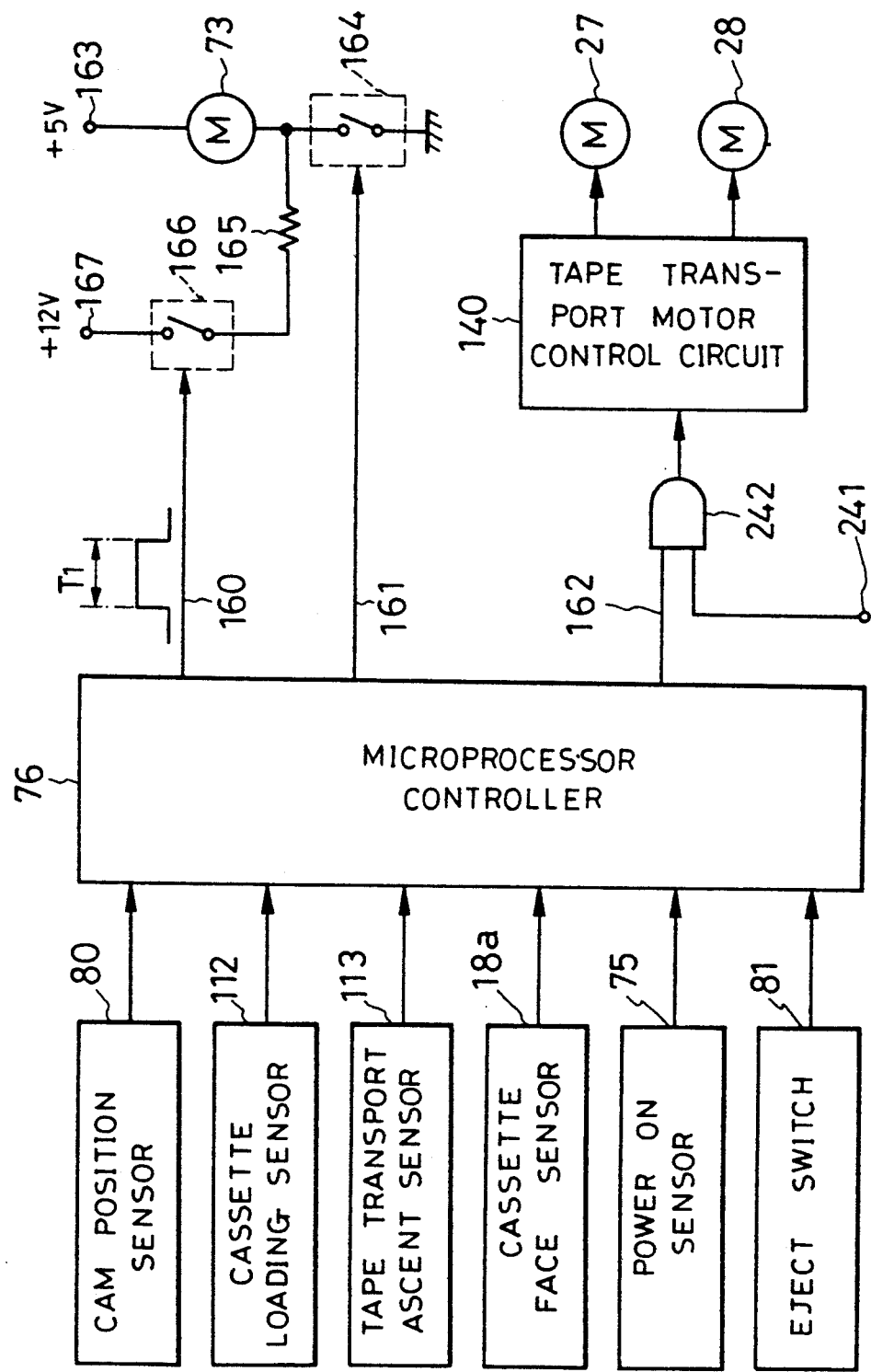
FIG. 22 is a block diagram of the electronic control system of the tape cassette apparatus.

FIG. 22 illustrates the electronic control system of the magnetic tape cassette apparatus 20. It includes a controller 76 which can take the form of a factory preprogrammed digital microprocessor or microcomputer in practice. Connected to this microprocessor controller 76 are: (a) a cam position sensor 80 for sensing the eject position and loading position of the dual control cam 67; (b) a cassette loading sensor 112 for sensing the loading of the tape cassette 1 in the apparatus 20; (c) a tape transport ascent sensor 113 for sensing the ascent of the pair of drive spindles 29 and 30 into driving engagement with the cassette hubs 10 and 11; (d) a cassette face sensor 18a for sensing whether or not the tape cassette 1 has been properly inserted with its top face 2 directed upward; (e) a "power on" sensor 75 for sensing the fact that the apparatus 20 has been electrically turned on; and (f) the eject switch 81, FIG. 2, on the front panel 33 of the apparatus 20. In response to the signals supplied from the listed components connected thereto, the controller 76 automatically controls the pair of tape transport motors 27 and 28 and the cam drive motor 73 according to the control program.

We will first describe the constructions of the cam position sensor 80, cassette loading sensor 112, tape transport ascent sensor 113, and cassette face sensor 18a under the respective subheadings. Then we will explain the control functions of the digital microprocessor controller 76.

Cam Position Sensor

As illustrated in FIG. 16, the dual control cam 67 has two index marks 77a and 77b, each in the form of a piece of reflective metal foil, attached to its bottom face in preassigned angular positions thereon. The first index mark 77a is for detection of the eject position of the dual control cam 67, and the second index mark 77b is for detection of its loading position. We will therefore refer to the first index mark 77a as the eject mark, and to the second index mark 77b as the loading mark, hereinafter in this specification.

Figure 23:
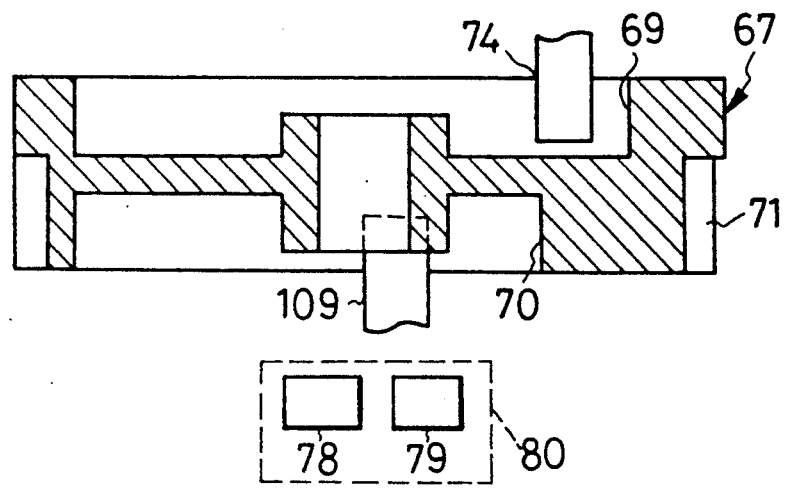
FIG. 23 is an axial section through the dual control cam, taken along the line XXIII—XXIII in FIG. 15, the cam being shown together with the cam position sensor.

Disposed under the dual control cam 67 is the cam position sensor indicated block diagrammatically at 80 in FIG. 23. The cam position sensor 80 comprises a light source 78 for throwing a coherent beam of light on the bottom face of the dual control cam 67, and a photodetector 79 for sensing the reflection of the light beam from the eject marks 77a and loading mark 77b.

Cassette Loading Sensor

Figure 24:
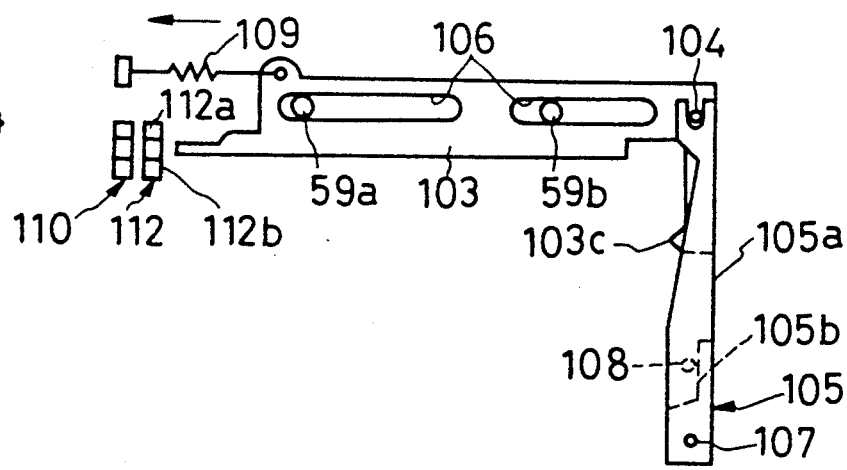
FIG. 24 is a plan view of the cassette loading sensor shown together with an optical interrupter and other means for the on off control of the sensor, such means being herein shown in a state when the tape cassette, not shown here, is not in the working position of FIG. 4.
Figure 25:
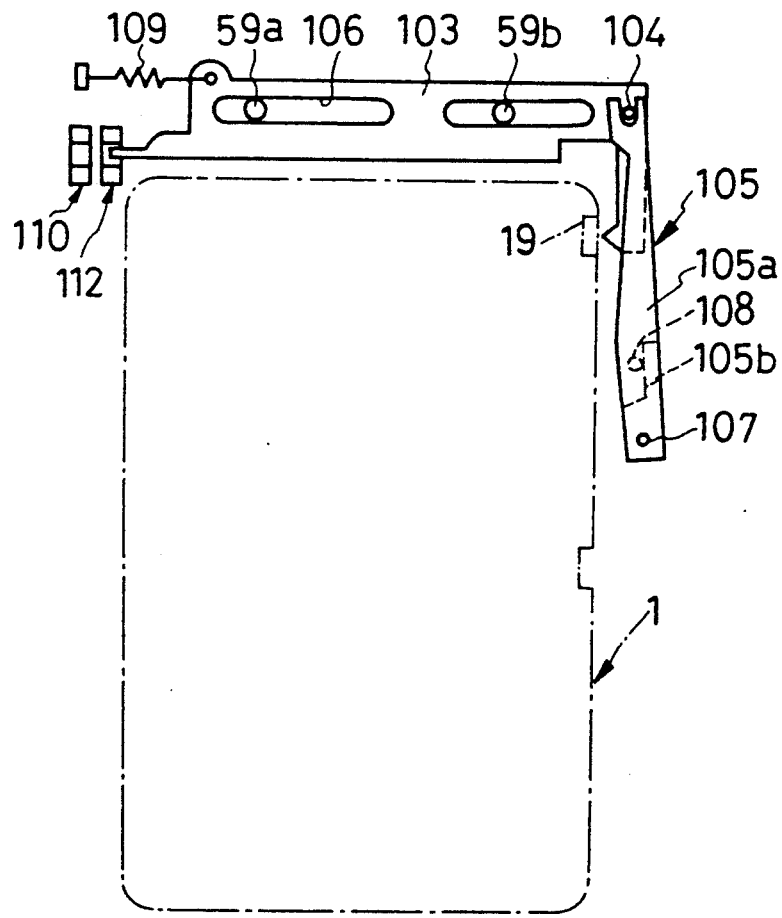
FIG. 25 is a view similar to FIG. 24 except that the means of FIG. 24 are shown in a state when the tape cassette, indicated by the phantom outline, is in the working position.
Figure 26:
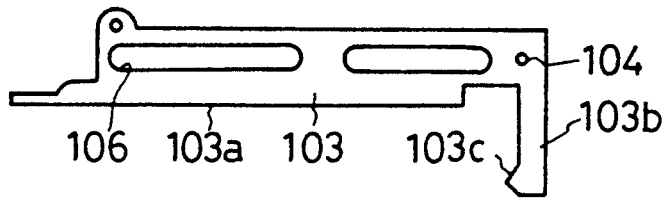
FIG. 26 is a plan view of the optical interrupter seen in FIGS. 24 and 25.

FIGS. 1, 3 and 4 indicate that the cassette loading sensor 112 is mounted on the baseplate 22 and on the path of an optical interrupter 103 which is shown fragmentarily in these figures and fully in FIGS. 24, 25 and 26. The cassette loading sensor 112 is also a combination of a light source 112a and a photodetector 112b disposed opposite each other with a spacing therebetween. The electric output from the cassette loading sensor 112 indicates that the tape cassette 1 has been loaded in the apparatus 20 when the tip of the optical interrupter 103 comes in between the light source and photodetector of the cassette loading sensor 112.

As will be noted from FIG. 24, the interrupter 103 is generally elongated in the direction of the notional line 37 in FIGS. 3 and 4. Two slots 106 are cut longitudinally in the interrupter 103 for slidably receiving the noted guide pins 59a and 59b for the reciprocator 46 shown in FIGS. 1, 3, 4 and 9. Thus, like the reciprocator 46, the interceptor 103 is movable back and forth along the notional line 37. A reference back to FIG. 9 will show that the interrupter 103 is disposed over the reciprocator 46 in parallel spaced relation thereto.

For the required movement along the notional line 37, the interrupter 103 is operatively linked to the cassette shift lever 44 via a cassette loading sensor lever 105 shown in both FIG. 9 and 24. Generally U shaped as seen in FIG. 9, the sensor lever 105 is supported, in the adjacency of its bight, by a pin 107 on the baseplate 22 for pivotal movement in a horizontal plane. The upper limb 105a of the sensor lever 105 is slotted in its end away from the pivot pin 107 for operatively engaging a pin 104 on the interrupter 103. The lower limb 105b of the sensor lever 105 butts sidewise against a pin 108 on the cassette shift lever 44 under the force of a helical tension spring 109 pulling the interrupter 103 toward the cassette loading sensor 112. The force of this tension spring 109 is of course less than that of the tension spring 47, FIGS. 1, 3 and 4, acting on the reciprocator 46 for biasing the cassette shift lever 44 in a clockwise direction.

FIG. 24 shows the positions of the interrupter 103 and cassette loading sensor lever 105 when the tape cassette 1 is not loaded in the apparatus 20. The interrupter 103 is away from the cassette loading sensor 112.

Upon loading of the tape cassette 1 in the apparatus 20, the cassette shift lever 44 will turn clockwise about its pivot 57 from its FIG. 3 to FIG. 4 position. The consequent leftward displacement of the pin 108 on the cassette shift lever 44 will permit the cassette loading sensor lever 105 to turn counterclockwise from its FIG. 24 to FIG. 25 position under the force of the tension spring 109. Thus the tip of the interrupter 103 will intrude between the light source 112a and photodetector 112b of the cassette loading sensor 112.

Preferably, and as shown also in FIGS. 24 and 25, the interrupter 103 should also be used for the on off control of a file protect sensor 110a disposed side by side with the cassette loading sensor 112. Toward this end, as best revealed by FIG. 26, the interrupter 103 has an arm 103b extending right angularly from one end of its major portion 103a and terminating in a lateral protuberance 103c. The protuberance 103c will butt against the file protect tab 19, if it has not been broken off, of the tape cassette 1 when the interrupter 103 is pulled from its FIG. 24 to FIG. 25 position by the force of the tension spring 109. Consequently, the interrupter 103 will not reach the file protect sensor 110a. If the file protect tab 19 has been broken off, on the other hand, then the interrupter 103 will travel farther to the left from its FIG. 25 position and so intrude between the light source and photodetector of the file protect sensor 110a thereby causing the same to produce a signal indicative of the fact that the loaded tape cassette 1 is protected against erasure or overwriting.

Tape Transport Ascent Sensor

As shown in FIG. 7, the tape transport ascent sensor 113 is also a combination of a light source 113a and a photodetector 113b, both disposed under the baseplate 22. An interrupter 113c for the tape transport ascent sensor 113 is shown formed in one piece with the web 99 of the tape transport carriage 26. Thus the interrupter 113c moves into and out of the spacing between the light source 113a and photodetector 113b of the tape transport ascent sensor 113 with the movement of the pair of drive spindles 29 and 30 into and out of driving engagement with the cassette hubs 10 and 11.

Cassette Face Sensor

The cassette face sensor 18a is a Microswitch (tradename) of pushbutton construction. As shown in FIG. 7, the cassette face sensor 18a is mounted to the web 99 of the tape transport carriage 26 for joint up and down movement therewith. When the tape cassette 1 is properly loaded in the apparatus 20 with its top face 2 directed upward as shown in FIG. 4, the cassette face sensor 18a will become received in the recess 18 in the tape cassette 1 upon ascent of the tape transport carriage 26 with the pair of drive spindles 29 and 30. The cassette face sensor 18a will then remain unactuated and continue the production of a high output. If the tape cassette is loaded with its bottom face 3 directed upward, on the other hand, then the cassette face sensor 18a will become actuated and go low. The controller 76, FIG. 22, will respond to this low output from the cassette face sensor 18a by causing the tape cassette 1 to be ejected.

Figure 27:
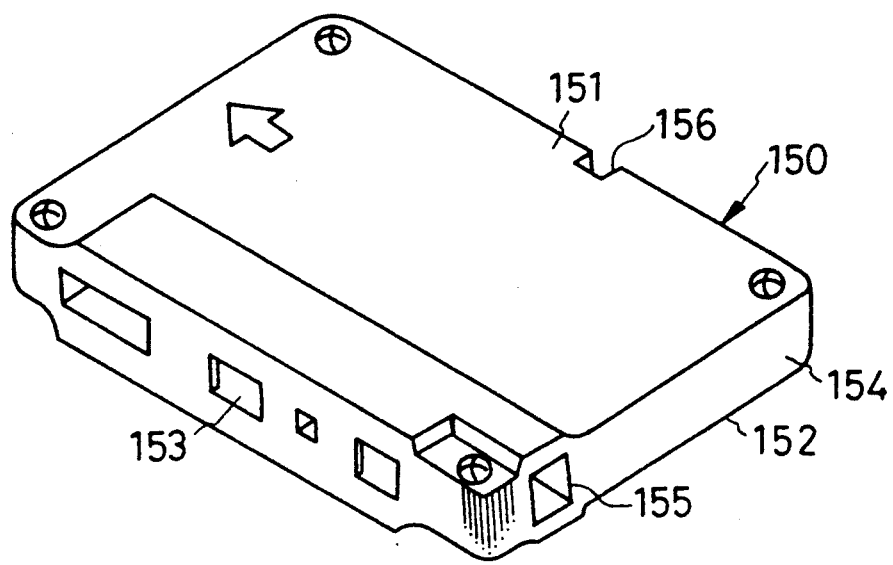
FIG. 27 is a perspective view of the cleaning cassette of known construction suitable for use with the tape cassette apparatus of our invention.

Before proceeding to the description of the controller 76, we will briefly refer FIG. 27 in order to explain the construction of the known cleaning cassette that can be put to use with the tape cassette apparatus 20 of our present invention. The illustrated cleaning cassette is of the same construction as that described and claimed in Miyao et al. U.S. Pat. No. 4,748,526, supra.

Generally designated 150 in FIG. 27, the cleaning cassette is of the same shape and size as the tape cassette 1 shown in FIGS. 5 and 6. The cleaning cassette 150 has a pair of opposite main faces 151 and 152 which correspond to the main faces 2 and 3 of the tape cassette 1 but which differ therefrom in having no openings for the insertion of the drive spindles 29 and 30. The cleaning cassette 150 is to be inserted in the entrance slot 34, FIG. 2, in the magnetic tape cassette apparatus 20 with its main face 151 directed upward. This main face 151 is therefore the top face of the cleaning cassette. A recess 156 is formed in the rear side of the cleaning cassette, in the same position as the recess 18, FIG. 5, is formed in the tape cassette 1. It is therefore possible for the cassette face sensor 18a to ascertain whether the cleaning cassette 150 is loaded in the apparatus 20 with its top face 151 directed upward.

An opening 155 is formed in one lateral side 154 of the cleaning cassette 150. After loading the cleaning cassette 150 in the apparatus 20, a cleaning stick is to be inserted in the opening 155 for cleaning the transducer 23 through an aperture 153 in the front side of the cleaning cassette.

Controller

The controller 76 relies on five different states of the tape cassette apparatus 20 for making various judgments needed in automatically controlling the cassette loading and ejecting operations of the apparatus according to the control program built into the controller. We call the five different states States I, II, III, IV and V respectively. The establishment or nonestablishment of these five States depends upon the outputs from the cam position sensor 80, cassette loading sensor 112, tape transport ascent sensor 113, cassette face sensor 18a, "power on" sensor 75, and eject switch 81. We will now set forth States I-V in detail.

State I is established when: (a) the output from the cam position sensor 80 is low, which means that the cam position sensor is opposed to neither of the eject mark 77a and loading mark 77b, FIG. 16, on the dual control cam 67; (b) the output from the cassette loading sensor 112 is low, which means that neither the tape cassette 1 nor the cleaning cassette 150 is loaded in the apparatus 20; (c) the output from the tape transport ascent sensor 113 is low, which means that the pair of drive spindles 29 and 30 are not engaged with the cassette hubs 10 and 11; and (d) the output from the cassette face sensor 18a is high, which means that the tape cassette 1 or the cleaning cassette 150 has been properly loaded in the apparatus 20 with their top face directed upward. State I can be expressed as [0001] in binary notation.

State II is established when: (a) the output from the cam position sensor 80 is low; (b) the output from the cassette loading sensor 112 is high, which means that either the tape cassette 1 or the cleaning cassette 150 is loaded in the apparatus 20; (c) the output from the tape transport ascent sensor 113 is low; and (d) the output from the cassette face sensor 18a is high. State II can be expressed as [0101].

State III is established when: (a) the output from the cam position sensor 80 is high, which means that the cam position sensor is opposed to either of the eject mark 77a and loading 77b on the dual control cam 67; (b) the output from the cassette loading sensor 112 is low; (c) the output from the tape transport ascent sensor 113 is low; and (d) the output from the cassette face sensor 18a is high. State III can be expressed as [1001].

State IV is established when: (a) the output from the cam position sensor 80 is high; (b) the output from the cassette loading sensor 112 is high; (c) the output from the tape transport ascent 113 is low; and (d) the output from the cassette face sensor 18a is high. State IV can be expressed as [1101].

State V is established when: (a) the output from the cam position sensor 80 is high; (b) the output from the cassette loading sensor 112 is high; (c) the output from the tape transport ascent sensor 113 is high, which means that the pair of drive spindles 29 and 30 are engaged with the cassette hubs 10 and 11; and (d) the output from the cassette face sensor 18a is high. State V can be expressed as [1111].

As shown also in FIG. 22, the controller 76 has two output lines 160 and 161 for controlling the cam drive motor 73, and another output line 162 for controlling the pair of tape transport motors 27 and 28. The cam drive motor 73, which is a reversible d.c. motor as aforesaid, is connected on one hand to a first supply terminal 163 which provides a first prescribed supply voltage of, say, five volts. On the other hand, the cam drive motor 73 is grounded via a first switch 164, besides being connected to a second supply terminal 167 via a resistor 165 and a second switch 166. The second supply terminal 167 provides a second prescribed supply voltage (e.g. twelve volts) that is higher than the first supply voltage.

The first switch 164 is normally open and is to be closed by a signal sent from the controller 76 over the line 161 for setting the cam drive motor 161 in forward rotation. The second switch 166 is also normally open and is to be closed by a pulse of short duration sent from the controller 76 over the line 160 for braking the cam drive motor 161. When the second switch 166 is closed, and the first switch 164 opened, the cam drive motor 73 is reversely energized and so braked to a rapid stop. In order to avoid the simultaneous closure of the two switches 164 and 166, the second switch 166 may be closed upon lapse of a preset short time following the opening of the first switch 164.

The rotation of the cam drive motor 161 is to be arrested when the cam position sensor 80 detects either the eject mark 77a or the loading mark 77b on the dual control cam 67. As will be noted by referring back to FIG. 16, each of the index marks 77a and 77b has such a dimension in the circumferential direction of the dual control cam 67 that the cam can be set out of rotation sufficiently quickly to hold the cam position sensor 80 opposed to which ever index mark it has detected. Normally, the cam drive motor 73 when being braked is reversely energized for such a short time that the motor will not actually rotate reversely. However, even if such reverse rotation of the cam drive motor somehow takes place, no trouble will occur if then the dual control cam stops with the cam position sensor 80 held opposed to that one of the index marks 77a and 77b it has detected.

The output line 162 of the controller 76 is connected to one of the two inputs of an AND gate 242, the other input of which is connected to a drive signal supply terminal 241. The output of the AND gate 242 is connected to a driver circuit 140 for the pair of tape transport motors 27 and 28. Thus the driver circuit 140 is enabled to drive the tape transport motors 27 and 28 as dictated by the drive signal from the supply terminal 241 only when the controller output sent to the AND gate 242 over the line 162 is high. The controller 76 is programmed to disable the AND gate 242 when the cleaning cassette 150, FIG. 27, is loaded in the apparatus 20.

Operation

We have already described the operations of the individual mechanisms of the tape cassette apparatus 20. In the following, therefore, we will refer to the timing chart of FIG. 28 and explain one cycle of cassette loading and ejecting operation, with emphasis on how the individual mechanisms operate in timed relation to one another under the control of the controller 76, and then proceed to the discussion of the control program. We will subdivide the following operational description under the subheadings of "Loading" and "Ejection".

Loading

The time $t_1$ in FIG. 28 is when the tape cassette 1, inserted in the entrance slot 34, arrives at the phantom retracted position in FIG. 3. At this time $t_1$, therefore, the eject lever 48 has been just turned counterclockwise from its FIG. 3 to FIG. 4 position against the force of the tension spring 62 by the tape cassette 1. Then, at a time $t_2$ very shortly after the time $t_1$, the cassette shift lever 44 has turned clockwise from its FIG. 3 position toward that of FIG. 4 under the force of the tension spring 47, as indicated at (A) in FIG. 28, thereby pushing the tape cassette 1 toward the working position of FIG. 4.

It is understood that the dual control cam 67 is still at rest and has been initialized to the predetermined angular position in which the cam follower pin 74 on the cassette shift lever 44 in the position $P_1$, FIG. 15, on the top face of the cam and in which the cam follower pin 109 on the tape transport descent lever 84 is in the position $P_1$, FIG. 16, on the bottom face of the cam. Therefore, with the clockwise turn of the cassette shift lever 44 at the time $t_2$, the cam follower pin 74 thereon will travel from position $P_1$ to position $P_{1a}$ on the top face of the dual control cam 67, butting against the constant radius section 69c of the cam edge 69 under the force of the tension spring 47. The tape cassette 1 will then be held loose in the working position.

As indicated at (B) in FIG. 28, the cassette loading sensor 112 will go high at the time $t_2$ upon detection of the tape cassette 1 in the working position. The controller 76 will then respond by setting the cam drive motor 73 into rotation for causing the ascent of the tape transport mechanism 25 into driving engagement with the tape cassette 1. With the consequent clockwise rotation of the dual control cam 67 as viewed in FIG. 16 (counterclockwise as viewed in FIG. 15), the cam follower pin 109 on the tape transport descent lever 84 will travel from position $P_1$ to position $P_2$ on the bottom face of the cam. The eject mark 77a on the dual control cam 67 will travel away from the cam position sensor 80 shortly after the cam starts rotation, so that the cam position sensor will go low at a time $t_3$, as at (F) in FIG. 28. Then the tape transport mechanism 25 will start ascending at a subsequent time $t_4$, as at (C) in FIG. 28. The pair of drive spindles 29 and 30 will smoothly move into driving engagement with the hubs 10 and 11 of the tape cassette 1 being held loose in the working position.

The tape transport ascent sensor 113 will go high at a time $t_5$, as at (D) in FIG. 28, when the driving engagement of the drive spindles 29 and 30 with the cassette hubs 10 and 11 is completed. Then, at a time $t_5$, the controller 76 will set the cam drive motor 73 out of rotation, as at (E) in FIG. 28, as the cam position sensor 80 detects the loading mark 77b on the bottom face of the dual control cam 16 at that time.

As will be noted by referring again to FIG. 15, the cam follower pin 74 on the cassette shift lever 44 is in the position $P_2$ on the top face of the dual control cam 67 at the time $t_6$ and has just ridden off the constant radius section 69c of the cam edge 69. Accordingly, the tape cassette 1 will come into abutment against the pair of limit stops 40 on the baseplate 22 under the force of the tension spring 47 and so will be firmly held in the working position as FIG. 4.

It is understood that the controller 76 initiates the rotation of the tape transport motors 27 and 28 at the time $t_5$ when the tape transport ascent sensor 113 detects the ascent of the tape transport mechanism 25 into driving engagement with the tape cassette 1. Data transfer between tape 9 and transducer 23 may therefore be commenced immediately upon loading of the cassette in the working position.

Ejection

At (G) in FIG. 28 is shown the eject pushbutton switch 81 actuated at a time $t_7$ after a desired run of data transfer. Then the controller 76 will cause the tape transport motors 27 and 28 to be set out of rotation, if they are in rotation, and also cause the cam drive motor 73 to be set into rotation, as at (E) in FIG. 28. Thereupon the cam follower pin 109 on the tape transport descent lever 84 will start traveling from position $P_2$ to position $P_3$, FIG. 16, on the bottom face of the dual control cam 67. As the cam follower pin 109 is thus forced to travel radially inwardly of the dual control cam 67 from its FIG. 18 to FIG. 19 position against the force of the tension spring 86, the pair of drive spindles 29 and 30 will descend out of driving engagement with the cassette hubs 10 and 11, as at (C) in FIG. 28. After the dual control cam 67 resumes rotation at the time $t_7$ as above, the loading mark 77b will travel away from the cam position sensor 80 at a time $t_8$, as at (F) in FIG. 28, and the tape transport ascent sensor 113 will go low at a subsequent time $t_9$, as at (D) in FIG. 28.

The cam follower pin 74 on the cassette shift lever 44 will ride over the constant radius section 69g, FIG. 15, of the cam edge 69 on the top face of the dual control cam 67 during its transition from $P_2$ to $P_3$. Accordingly, the tape cassette 1 will remain loose in the working position, permitting the tape transport mechanism 25 to descend smoothly out of driving engagement therewith.

Then, at a time $t_{10}$, when the descent of the tape transport mechanism 25 is completed as at (C) in FIG. 28, the cam follower pin 74 on the cassette shift lever 44 will start riding over the decreasing radius section 69a of the cam edge 69. Thus traveling radially inwardly of the dual control cam 67, the cam follower pin 74 will cause the cassette shift lever 44 to turn counterclockwise from its FIG. 4 to FIG. 3 position against the force of the tension spring 47. Then, upon full retraction of the tape cassette 1 from the working position of FIG. 4 to the phantom retracted position of FIG. 3, the cam follower pin 64 on the reciprocator 46 will enter the arcuate portion 65 of the cam slot 63 in the eject lever 48. Then the eject lever 48 will turn counterclockwise under the bias of the tension spring 62 and so eject the tape cassette 1 as indicated by the solid line in FIG. 3.

As indicated at (B) in FIG. 28, the cassette loading sensor 112 will go low at a time $t_{11}$ after the time $t_{10}$ when the ejection of the tape cassette 1 starts as above. Then, at a time $t_{12}$, when the cam position sensor 80 detects the eject mark 77a on the dual control cam 67 as at (F) in FIG. 28, the controller 76 will set the cam drive motor 73 out of rotation.

Control Program

The above summarized operation of the tape cassette apparatus 20 takes place according to the control program built into the microprocessor controller 76. The control program comprises three routines, a "Power On" Routine flowcharted in FIG. 29, a Loading Routine in FIG. 30, and an Eject Routine in FIG. 31.

"Power On" Routine

Figure 29:
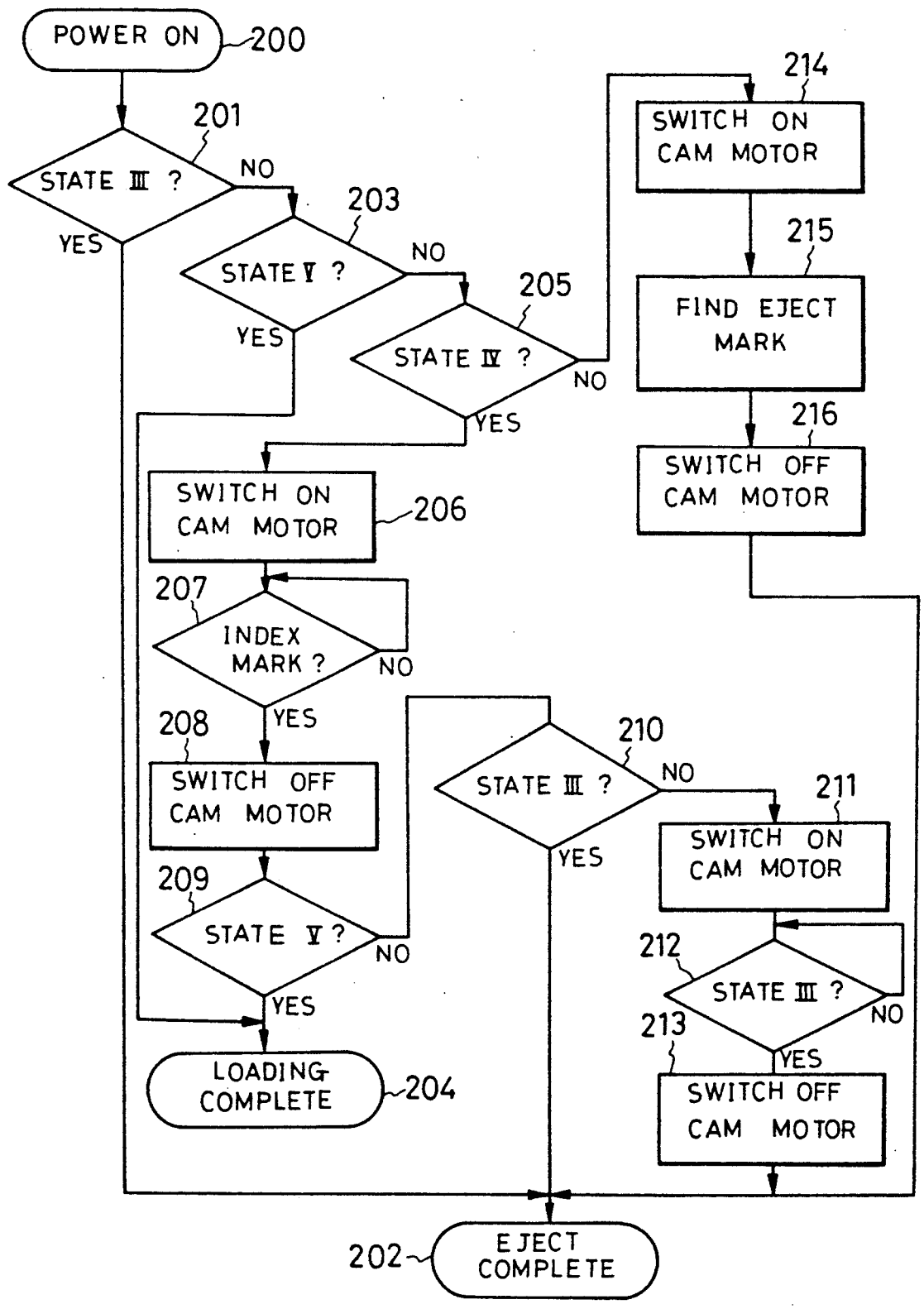
FIG. 29 is a flowchart setting forth the "power on" routine of the control program built into the microprocessor controller of the FIG. 22 control system.

With reference to FIG. 29 the "Power On" Routine begins when the "power on" sensor 75, FIG. 22, signals the controller 76 at a block 200 that the tape cassette apparatus 20 has been electrically turned on. Then, at a "State III" node 201, the controller 76 determines whether the apparatus is in State III, [1001]. The answer to this "State III" node 201 will be yes if neither the tape cassette 1 nor the cleaning cassette 150 has been loaded, and no if either has been loaded, when the apparatus is switched on.

Let us first assume that the answer to the "State III" node 21 is yes. Since then neither the tape cassette 1 nor the cleaning cassette 150 is yet loaded, the routine jumps from the node 201 to an "Eject Complete" node 202 where, presuming that the cam position sensor 80 is opposed to the eject mark 77a rather than to the loading mark 77b, the controller 76 produces a signal indicative of the completion of cassette ejection instead of setting the cam drive motor 73 into rotation.

If the answer to the "State III" node 201 is no, on the other hand, then the controller determines at the next "State V" node 203 whether the apparatus is in State V, [1111]. The answer yes to the "State V" node 203 means that the tape cassette 1 has been loaded in the correct attitude, and that the pair of drive spindles 29 and 30 have been moved into driving engagement with the cassette hubs 10 and 11. In that case, therefore, the controller produces at a "Loading Complete" node 204 a signal indicative of the completion of the loading of the tape cassette 1.

The answer no to the node 203, on the other hand, directs the routine to a "State IV" node 205 for the determination of whether the apparatus is in State IV, [1101]. The answer yes to the node 205 means that the drive spindles 29 and 30 are not yet engaged with the cassette hubs 10 and 11 although the tape cassette has been loaded. Therefore, at a block 206, the controller 76 closes the switch 164, FIG. 22, and so sets the cam drive motor 73 into rotation. Then, with the rotation of the cam drive motor 73, the tape transport mechanism 25 will ascend for the establishment of driving engagement of the drive spindles 29 and 30 with the cassette hubs 10 and 11.

Then, at the next "Index Mark" node 207, the controller determines whether either of the two index marks 77a and 77b on the dual control cam 67 is detected by the cam position sensor 80. The answer yes to the node 207 leads the routine to a block 208 where the controller discontinues the rotation of the cam drive motor 73. To this end the controller opens the switch 164 and closes the switch 166 for a predetermined brief time. Thus energized reversely, the cam drive motor 73 will be braked to a rapid stop.

The next "State V" node 209 is equivalent to the node 203. Thus, if the answer to the node 209 is yes, the controller produces a signal indicative of the completion of the loading of the tape cassette 1 at the "Loading Complete" node 204.

The answer no to the "State V" node 209 leads the routine to a "State III" node 210, where the controller determines whether the apparatus is in State III, [1001]. The answer yes to the "State III" node 210 means that the cam position sensor 80 had detected the loading mark 77b on the dual control cam 67 before the cam drive motor 73 was set into rotation at the block 206. Thus, if the answer to the node 210 is yes, the produces the signal indicative of the completion of cassette ejection at the "Eject Complete" node 202.

If the answer to the "State III" node 210 is no, on the other hand, then the controller again sets the cam drive motor 73 into rotation by closing the switch 164 at a block 211. Then, at another "State III" node 212, the controller determines whether the apparatus is in State III, [1001]. When the answer to this "State III" node 210 becomes yes, the controller proceeds to set the cam drive motor 73 out of rotation at a block 213. Then the controller produces the eject complete signal. The answer to the "State III" node 210 will be no, as above, if the cleaning cassette 150, FIG. 27, has been loaded in the apparatus 20.

The answer no to the "State IV" node 205 means that the dual control cam 67 was somehow angularly displaced while the apparatus was off, so that the cam position sensor was opposed to neither of the index marks 77a and 77b on the dual control cam 67 when the apparatus was turned on. In that case the controller has no knowledge whatever of the positions of the two index marks with respect to the cam position sensor 80. However, the dual control cam 67 can be quickly reinitialized through a recalibration subroutine included in this "Power On" Routine, as set forth in the following.

The recalibration subroutine starts at a block 214 where the controller sets the cam drive motor 73 into rotation. As the cam position sensor 80 successively detects the index marks 77a and 77b during the subsequent rotation of the dual control cam 67, the controller calculates the time intervals between them and ascertains the detection of the eject mark 77a from such intervals. As will be understood by referring back to FIG. 16, the index marks 77a and 77b are not in diametrically opposite positions on the dual control cam 67. In the illustrated embodiment, as the dual control cam 67 rotates at a constant speed in the arrow marked direction, the time interval from the moment of detection of the eject mark 77a to the moment of detection of the loading mark 77b is much less than the time interval from the moment of detection of the loading mark 77b to the moment of detection of the eject mark 77a. The controller can discriminate between the two index marks 77a and 77b from this difference between the two time interval.

Thus, ascertaining at a block 215 that the cam position sensor 80 has detected the eject mark 77a, the controller proceeds to bring the cam drive motor 73 to a quick braked stop at a block 216 preceding the "eject complete" node 202. The recalibration subroutine comprising the blocks 214-216 is effective to quickly make the apparatus ready for cassette loading.

Loading Routine

Figure 30:
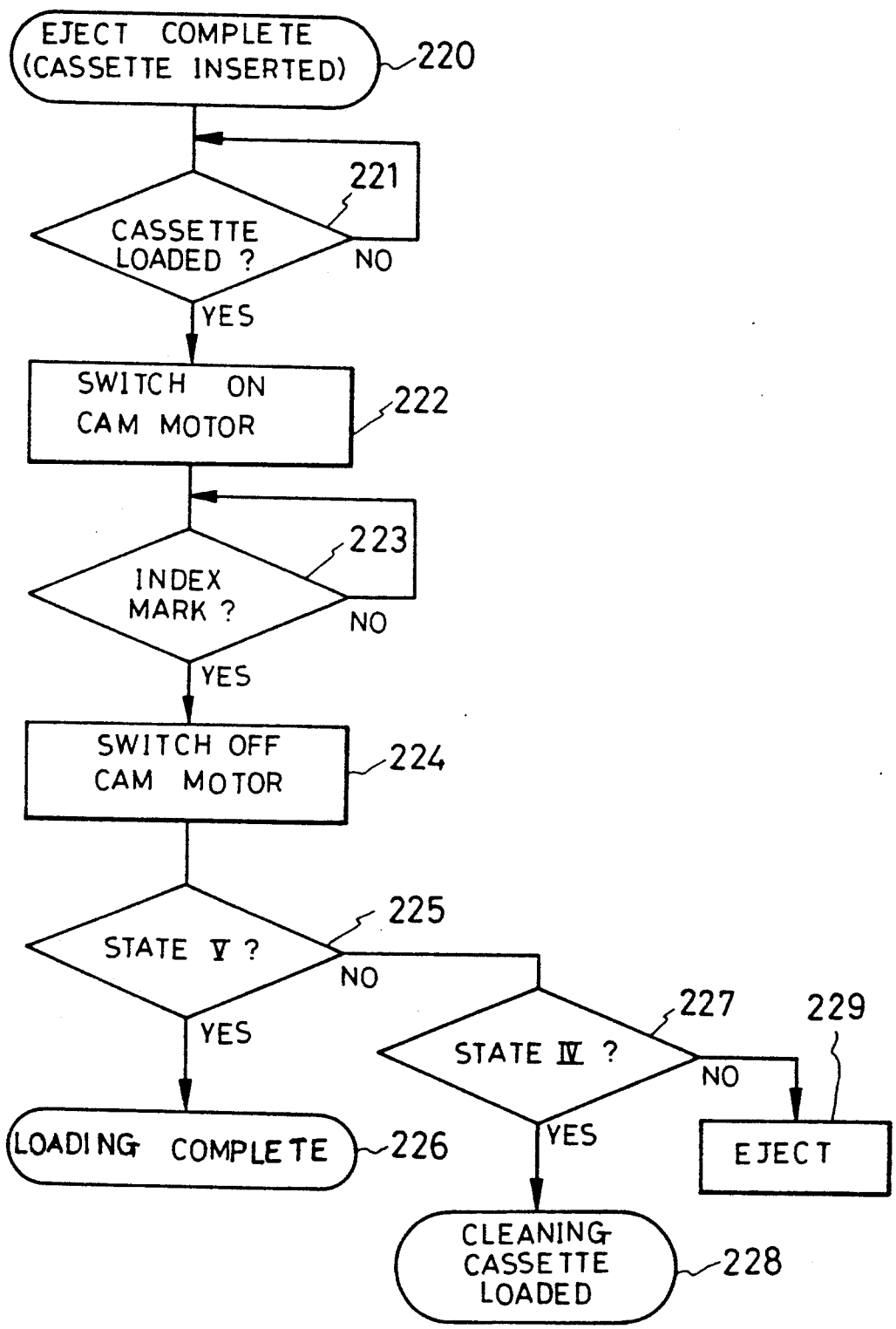
FIG. 30 is a flowchart setting forth the loading routine of the control program.

The Loading Routine of FIG. 30 begins when either of the tape cassette 1 and the loading cassette 150 is inserted in the apparatus 20 when it is in the "eject complete" state set forth above. So the Loading Routine starts with an "Eject Complete" node 220. When the tape cassette 1 or cleaning cassette 150 arrives at the working position of FIG. 4, the controller is informed of this fact by the cassette loading sensor 112 at a "cassette loaded" node 221. Then the controller sets the cam drive motor 73 into rotation at a block 222.

Then, at an "Index Mark" node 223, the controller determines whether either of the index marks 77a and 77b on the dual control cam 67 in rotation is detected by the cam position sensor 80. Since the dual control cam 67 has started rotation when the apparatus was in the "eject complete" state, the answer to the "Index Mark" node 223 will become yes when the cam position sensor 80 detects the loading mark 77b. Thereupon the controller arrests the rotation of the cam drive motor 73 at a block 224 by the rapid braking method set forth in connection with the block 206 of the "Power On" Routine in FIG. 29.

Then, at a "State V" node 225, the controller determines whether the apparatus is in State V, [1111]. The answer to this "State V" node is therefore yes when the cassette, which has now proved to be the tape cassette 1, has been completely loaded in the working position, ready for the commencement of data transfer. Thus the controller produces the "loading complete" signal at the next "loading complete" node 226.

If the answer to the "State V" node 225 is no, on the other hand, then the controller proceeds to determine whether the apparatus is in State IV, [1101], at a "State IV" node 227. The answer yes to the "State IV" node 227 means that the drive spindles 29 and 30 will not ascend into engagement with the loaded cassette, and accordingly that the cleaning cassette 150 has been loaded. Thus, at a node 228, the controller produces a signal indicative of the completion of the loading of the cleaning cassette 150.

Ascertaining the loading of the cleaning cassette 150 as above, the controller proceeds to send a low output to the AND gate 242, FIG. 22, over the line 162. With the AND gate 242 thus disabled, the driver circuit 140 can no longer respond to the drive signal from the supply terminal 241. Therefore, when the cleaning cassette 150 is loaded, the controller inhibits the rotation of the tape transport motors 27 and 28 in order to prevent the rotation of the drive spindles 29 and 30 in frictional contact with the bottom face of the loaded cleaning cassette.

The answer to the "State IV" node 227 may be no, in which case the tape cassette 1 or the cleaning cassette 150 may have been inserted with their bottom side directed upward. The controller therefore causes the cassette to be ejected at a block 229. The resulting ejection of the cassette takes place through part of the Eject Routine set forth hereafter.

Eject Routine

Figure 31:
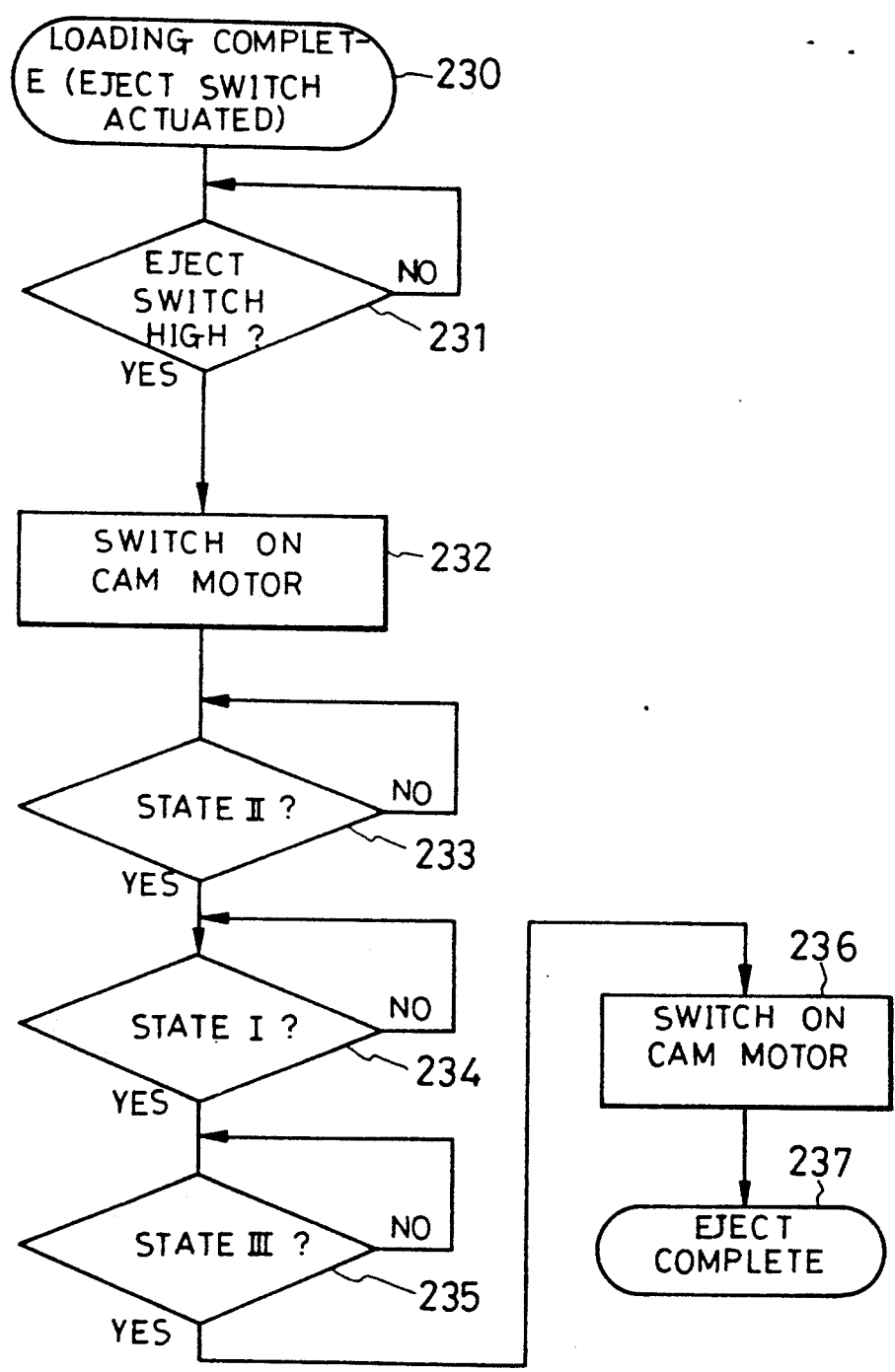
FIG. 31 is a flowchart setting forth the ejection routine of the control program.

The controller is triggered into the Eject Routine of FIG. 31 when the eject pushbutton switch 81 is actuated while either the tape cassette 1 or the cleaning cassette 150 has been loaded. Upon actuation of the eject switch at a node 230 the controller determines at a node 231 whether the eject switch has gone high. If the answer is yes, which means that the eject switch has been depressed, then the controller sets the cam drive motor 73 into rotation at a block 232. Then, at the next "State II" node 233, the controller determines whether the apparatus is in the State II, [0101]. If the tape cassette 1 has been loaded, the answer to the "State II" node 233 will become yes when the tape transport ascent sensor 113 goes low upon descent of the drive spindles 29 and 30 out of driving engagement with the cassette hubs 10 and 11. If the cleaning cassette 150 has been loaded, then of course the output from the tape transport ascent sensor 113 will have been low.

Then, at a "State I" node 234, the controller determines whether the apparatus is in State I, [0001]. The answer to the "State I" node 234 will become yes when the cassette loading sensor 112 goes low upon ejection of the tape cassette 1 or cleaning cassette 150.

Then, at a "State III" node 235, the controller determines whether the apparatus is in State III, [1001], that is, whether the cam position sensor 80 has detected the eject mark 77a on the dual control cam 67. The controller sets the cam drive motor 73 out of rotation at a block 236 when the answer to the "State III" node 235 becomes yes. At this time, too, the controller causes the cam drive motor 73 to come to a quick stop in the manner explained in connection with the block 208 of the FIG. 29 "Power On" Routine. Then the Eject Routine ends at an "Eject Complete" node 237. The cassette ejection at the block 229 of the FIG. 30 Loading Routine takes place through the procedure from block 232 to node 237 of this Eject Routine.

Advantages

Having thus described our invention in terms of a preferred embodiment thereof, we may summarize the advantages gained by this particular embodiment as follows:

1. The controller 76 determines the fact that either the tape cassette 1 or the cleaning cassette 150 has been ejected, upon establishment of State III, [1001], as indicated in both FIGS. 29 and 30. That is to say, unlike the prior art, the controller relies not only on the cassette loading sensor 112 but also on the cam position sensor 80, determining that the cassette has been ejected when the cam position sensor detects the eject mark 77a on the dual control cam 67. Thus the ejection of the tape cassette or the cleaning cassette can be completed with the dual control cam 67 infallibly initialized in its predetermined angular position.

2. The controller 76 determines the loading of the tape cassette 1 upon establishment of State V, [1111], as indicated in both FIGS. 29 and 30. State V is such that the controller relies on the detection of the loading mark 77b on the dual control cam 67 by the cam position sensor 80, besides relying on the cassette face sensor 18a, cassette loading sensor 112, tape transport ascent sensor 113. The dual control cam 67 can therefore be infallibly held in the loading position upon completion of cassette loading.

3. The controller 76 can positively discriminate between the tape cassette 1 and the cleaning cassette 1 from the establishment or nonestablishment of State IV, [1101].

4. The controller 76 disables the AND gate 242, FIG. 22, upon detection of the loading of the cleaning cassette 150, as at the "cleaning cassette" node 228 in the FIG. 30 Loading Routine, thereby preventing the rotation of the tape transport motors 27 and 28. Thus the drive spindles 29 and 30 are not to rotate in frictional engagement with the loaded cleaning cassette.

5. The rotation of the dual control cam 67 can be arrested exactly in either of the two required positions as the cam drive motor 73 is electrically braked to a quick stop by the circuit arrangement of FIG. 22.

6. The controller 76 can discriminate between eject mark 77a and loading mark 77b from unequal time intervals at which they are detected. Consequently, even if the dual control cam 67 has been angularly displaced from the eject position while the apparatus is off, the controller can readily reinitialize the cam through the recalibration subroutine of the FIG. 29 "Power On" Routine.

7. The cassette face sensor 18a, mounted to the tape transport carriage 26 for joint up and down movement therewith, enables the controller 76 to accurately determine the loading of the tape cassette or cleaning cassette in the correct attitude.

Possible Modifications

Although we have shown and described the magnetic tape cassette apparatus of our invention in terms of a preferred form thereof, we do not wish our invention to be limited by the exact details of the foregoing disclosure. The following, then, is a brief list of possible modifications or alterations of the illustrated embodiment which we believe all fall within the scope of our invention:

1. Logic gates could be employed for the determination of the establishment or nonestablishment of States I-V; that is, the microprocessor controller 76 could be replaced by individual electronic circuits capable of performing the functions required by the flowcharts of FIGS. 29-30.

2. The contoured cam edges 69 and 70 on the opposite faces of the dual control cam 69 could be formed on separate cam members rotatable jointly about a common axis, although we recommend the illustrated construction because of its much greater simplicity and compactness. The suggested coaxial cam members might then be termed a cassette shift control cam and a tape transport shift control cam, respectively.

3. The cassette carriage 42 could take the shape of a box capable of accommodating the tape cassette 1 or the cleaning cassette 1, or the flat cassette carriage could be so disposed as to underlie the cassette.

4. Our invention could be applied to magnetic tape cassette apparatus of the known capstan drive type.

What we claim is:

1. An apparatus for data transfer with a tape cassette of the type having a generally flat boxlike housing accommodating a length of tape for transportation between a pair of hubs mounted within the housing for rotation about respective axes disposed in parallel spaced relationship with each other, with the tape exposed through an aperture in a predetermined front side of the housing extending parallel to a notional line right angularly intersecting the axes of rotation of the hubs, the tape cassette having a principal plane at right angles with the axes of rotation of the hubs, the apparatus comprising:

(a) a casing having defined therein an entrance opening through which the tape cassette is to be inserted in the casing in the direction of the notional line and with the front side of the cassette housing oriented in a predetermined direction relative to the casing, the tape cassette lying in a preassigned retracted position within the casing upon full insertion therein through the entrance opening;

(b) a transducer so disposed within the casing as to confront with a spacing therebetween the front side of the housing of the tape cassette lying in the retracted position;

(c) cassette shift means for reciprocably moving the tape cassette relative to the casing in the principal plane of the tape cassette and in a direction normal to the notional line between the retracted position and a preassigned working position, the tape cassette when in the working position having its tape in data transfer contact with the transducer through the aperture in the front side of the cassette housing;

(d) tape transport means comprising a pair of drive spindles movable linearly into and out of driving engagement with the hubs of the tape cassette lying in the working position;

(e) tape transport shift means operatively engaged with the tape transport means for causing the linear movement of the drive spindles into and out of driving engagement with the cassette hubs;

(f) dual control cam means comprising a cassette shift control cam and a tape transport shift control cam which are rotatable jointly about a common axis, the cassette shift control cam being engaged with the cassette shift means for causing the tape cassette to travel between the retracted and the working position, the tape transport shift control cam being engaged with the tape transport shift means for causing the linear movement of the drive spindles into and out of driving engagement with the cassette hubs;

(g) cam drive means coupled to the dual control cam means for causing the joint rotation of the cassette shift control cam and the tape transport shift control cam about the common axis;

(h) eject means for ejecting the tape cassette out of the entrance opening in the casing when the tape cassette is moved from the working position back to the retracted position by the cassette shift means;

(i) a cam position sensor for detecting an eject position of the dual control cam means in which the tape cassette is in the retracted position and in which the drive spindles of the tape transport means are out of driving engagement with the cassette hubs, and a loading position of the dual control cam means in which the tape cassette is in the working position and in which the drive spindles of the tape transport means are in driving engagement with the cassette hubs;

(j) a cassette loading sensor for ascertaining whether the tape cassette is in the working position;

(k) a tape transport sensor for ascertaining whether the drive spindles of the tape transport means are in or out of driving engagement with the cassette hubs; and (l) controller means having inputs connected to the cam position sensor and the cassette loading sensor and the tape transport sensor and having an output connected to the cam drive means for controlling the joint rotation of the cassette shift control cam and the tape transport shift control cam, the controller means determining the loading of the tape cassette in the working position when the tape transport sensor indicates that the drive spindles of the tape transport means are in driving engagement with the cassette hubs and, at the same time, when the cam position sensor indicates that the dual control cam means is in the loading position, and determining the ejection of the tape cassette when the cassette loading sensor indicates the absence of the tape cassette from the working position and, at the same time, when the cam position sensor indicates that the dual control cam means is in the eject position.

2. The tape cassette apparatus of claim 1 wherein the cam position sensor detects the eject position and loading position of the dual control cam means by detecting an eject mark and a loading mark, respectively, formed in preassigned angular positions on either of the cassette shift control cam and the tape transport shift control cam.

3. The tape cassette apparatus of claim 2 wherein the eject mark and the loading mark are disposed eccentrically and in other than diametrically opposed positions on either of the cassette shift control cam and the tape transport shift control cam, whereby the control circuit can determine which of the eject mark and the loading mark is detected by the cam position sensor, on the bases of unequal time intervals at which the eject mark and the loading mark are detected successively by the cam position sensor.

4. The tape cassette apparatus of claim 3 further comprising a "power on" sensor connected to the controller means for signaling the fact that the apparatus is electrically turned on, the controller means responding to the signal from the "power on" sensor by determining whether the eject mark or the loading mark is being detected by the cam position sensor and, if not, by causing the cam drive means to rotate the cassette shift control cam and the tape transport shift control cam until the cam position sensor detects the eject mark.

5. The tape cassette apparatus of claim 1 wherein the housing of the tape cassette has a first and a second main face at right angles with the front side of the cassette housing, and wherein the apparatus further comprises a cassette face sensor connected to the controller means for signaling whether the tape cassette is loaded in the apparatus with the first main face of the cassette housing oriented in a second predetermined direction, at right angles with the first recited predetermined direction, relative to the casing.

6. The tape cassette apparatus of claim 5 wherein the housing of the tape cassette has a recess formed in a preassigned position thereon, and wherein the cassette face sensor is mounted to the tape transport means for joint movement with the pair of drive spindles, the cassette face sensor being received in the recess in the cassette housing upon movement of the drive spindles into driving engagement with the cassette hubs only when the tape cassette is loaded in the apparatus with the front side of the cassette housing oriented in the first predetermined direction and with the first main face of the cassette housing oriented in the second predetermined direction.

7. The tape cassette apparatus of claim 1 wherein the cam drive means comprises:
(b) a reversible direct current motor drivingly coupled to the dual control cam means; and
(b) a motor driver circuit for setting the motor into and out of rotation in a predetermined forward direction, and for quickly arresting the forward rotation of the motor by reversely energizing the motor, both under the control of the controller means.

8. The tape cassette apparatus of claim 1 wherein the apparatus is for use with a cleaning cassette of substantially the same shape and size as the tape cassette, and wherein the controller means has an output connected to the tape transport means for preventing the rotation of the drive spindles when the cassette loading sensor indicates the presence of either the tape cassette or the cleaning cassette in the working position but when the tape transport sensor indicates that the drive spindles of the tape transport means will not move into driving engagement with the cassette lying in the working position.

9. An apparatus for data transfer with a tape cassette of the type including a generally flat boxlike housing having a first and a second opposite main face and a front side right angularly joining the main faces, and a length of tape extending between a pair of hubs mounted within the housing for rotation about respective axes disposed in parallel spaced relationship with each other, the tape being exposed through an aperture in the front side of the cassette housing which extends parallel to a notional line right angularly intersecting the axes of rotation of the hubs, the tape cassette having a principal plane parallel to the main faces of the cassette housing, the apparatus comprising:
(a) a casing having defined therein an entrance opening through which the tape cassette is to be inserted in the casing in the direction of the notional line, with the front side of the cassette housing oriented in a first predetermined direction relative to the casing and with the first main face of the cassette housing oriented in a second predetermined direction at right angles with the first predetermined the tape cassette lying in a preassigned retracted position within the casing upon full insertion therein through the entrance opening;
(b) a transducer so disposed within the casing as to confront with a spacing therebetween the front side of the housing of the tape cassette lying in the retracted position;
(c) cassette shift means for reciprocably moving the tape cassette relative to the casing in the principal plane of the tape cassette and in a direction normal to the notional line between the retracted position and a preassigned working position, the tape cassette when in the working position having its tape in data transfer contact with the transducer through the aperture in the front side of the cassette housing;
(d) tape transport means comprising a pair of drive spindles movable linearly into and out of driving engagement with the hubs of the tape cassette lying in the working position;
(e) tape transport shift means operatively engaged with the tape transport means for causing the linear movement of the drive spindles into and out of driving engagement with the cassette hubs;
(f) dual control cam means comprising a cassette shift control cam and a tape transport shift control cam which are rotatable jointly about a common axis, the cassette shift control cam being engaged with the cassette shift means for causing the tape cassette to travel between the retracted and the working position, the tape transport shift control cam being engaged with the tape transport shift means for causing the linear movement of the drive spindles into and out of driving engagement with the cassette hubs;

(g) cam drive means coupled to the dual control cam means for causing the joint rotation of the cassette shift control cam and the tape transport shift control cam about the common axis;

(h) eject means for ejecting the tape cassette out of the entrance opening in the casing when the tape cassette is moved from the working position back to the retracted position by the cassette shift means;

(i) a cam position sensor for providing a digital output indicative of an eject position of the dual control cam means in which the tape cassette is in the retracted position and in which the drive spindles of the tape transport means are out of driving engagement with the cassette hubs, and a loading position of the dual control cam means in which the tape cassette is in the working position and in which the drive spindle of the tape transport means are in driving engagement with the cassette hubs;

(j) a cassette loading sensor for providing a digital output indicative of whether the tape cassette is in the working position;

(k) a tape transport sensor for providing a digital output indicative of whether the drive spindles of the tape transport means are in or out of driving engagement with the cassette hubs;

(l) a cassette face sensor for providing a digital output indicative of whether the tape cassette is loaded in the apparatus with the first main face of the cassette housing oriented in the second predetermined direction; and (m) controller means having inputs connected to the cam position sensor and the cassette loading sensor and the tape transport sensor and the cassette face sensor and having an output connected to the cam drive means for controlling the joint rotation of the cassette shift control cam and the tape transport shift control cam, the controller means relying on the digital outputs from the cam position sensor and the cassette loading sensor and the tape transport sensor and the cassette face sensor for the determination of the loading of the tape cassette in the working position and the ejection of the tape cassette.

10. A tape cassette apparatus for interchangeable use with a tape cassette and a cleaning cassette, the tape cassette being of the type having a generally flat boxlike housing having a principal plane and accommodating a length of tape for transportation between a pair of hubs mounted within the housing for rotation about respective axes disposed in parallel spaced relationship with each other, with the tape exposed through an aperture in a predetermined front side of the housing extending parallel to a notional line right angularly intersecting the axes of rotation of the hubs, the cleaning cassette having a housing of substantially the same shape and size as the housing of the tape cassette, the apparatus comprising:

(a) a casing having defined therein an entrance opening through which the tape cassette or the cleaning cassette is to be inserted in the casing in the direction of the notional line and with the front side of the cassette housing oriented in a predetermined direction relative to the casing, the tape cassette or the cleaning cassette lying in a preassigned retracted position within the casing upon full insertion there in through the entrance opening;

(b) a transducer so disposed within the casing as to confront with a spacing therebetween the front side of the housing of the tape cassette or the cleaning cassette lying in the retracted position;

(c) cassette shift means for reciprocably moving the tape cassette or the cleaning cassette relative to the casing in the principal plane of the cassette housing and in a direction normal to the notional line between the retracted position and a preassigned working position, the tape cassette when in the working position having its tape in data transfer contact with the transducer through the aperture in the front side of the cassette housing;

(d) tape transport means comprising a pair of drive spindles movable linearly into and out of driving engagement with the hubs of the tape cassette lying in the working position;

(e) tape transport shift means operatively engaged with the tape transport means for causing the linear movement of the drive spindles into and out of the tape driving engagement with the tape cassette, the drive spindles moving into abutment against the housing of the cleaning cassette when the cleaning cassette is in the working position;

(f) dual control cam means comprising a cassette shift control cam and a tape transport shift control cam which are rotatable jointly about a common axis, the cassette shift control cam being engaged with the cassette shift means for causing the tape cassette or the cleaning cassette to travel between the retracted and the working position, the tape transport shift control cam being engaged with the tape transport shift means for causing the linear movement of the drive spindles into and out of driving engagement with the tape cassette or into and out of abutment against the cleaning cassette;

(g) cam drive means coupled to the dual control cam means for causing the joint rotation of the cassette shift control cam and the tape transport shift control cam about the common axis;

(h) eject means for ejecting the tape cassette or the cleaning cassette out of the entrance opening in the casing when the tape cassette or the cleaning cassette is moved from the working position back to the retracted position by the cassette shift means; and (i) control means for determining which of the tape cassette and the cleaning cassette is in the working position and for preventing the drive spindles from rotation in frictional engagement with the cleaning cassette when the cleaning cassette is in the working position.

11. The tape cassette apparatus of claim 10 wherein the control means comprises:

(a) a cam position sensor for detecting an eject position of the dual control cam means in which the tape cassette or the cleaning cassette is in the retracted position and in which the drive spindles of the tape transport means are out of driving engagement with the tape cassette or out of frictional engagement with the cleaning cassette, and a loading position of the dual control cam means in which the tape cassette or the cleaning cassette is in the working position and in which the drive spindles of the tape transport means are in driving engagement with the tape cassette or in frictional engagement with the cleaning cassette;

(b) a cassette loading sensor for ascertaining whether the tape cassette or the cleaning cassette is in the working position;

(c) a tape transport sensor for ascertaining whether the drive spindles of the tape transport means are in or out of driving engagement with the tape cassette;

(d) controller means having inputs connected to the cam position sensor and the cassette loading sensor and the tape transport sensor and having an output connected to the tape transport means for preventing the rotation of the drive spindles when the cam position sensor indicates that the dual control cam means is in the loading position, when the cassette loading sensor indicates the presence of the tape cassette or the cleaning cassette in the working position and, at the same time, when the tape transport sensor indicates that the drive spindles are out of driving engagement with the cassette in the working position.

* * * * *